US010527190B2

(12) United States Patent
Lurk et al.

(10) Patent No.: US 10,527,190 B2
(45) Date of Patent: Jan. 7, 2020

(54) UNLOAD TEE

(71) Applicant: Bray International, Inc., Houston, TX (US)

(72) Inventors: Michael James Lurk, Sainte Genevieve, MO (US); Thomas Linhorst, Perryville, MO (US); John Long, Festus, MO (US)

(73) Assignee: Bray International, Inc., Houston, TX (US)

( * ) Notice: Subject to any disclaimer, the term of this patent is extended or adjusted under 35 U.S.C. 154(b) by 95 days.

(21) Appl. No.: 15/474,648

(22) Filed: Mar. 30, 2017

(65) Prior Publication Data

US 2017/0284559 A1  Oct. 5, 2017

Related U.S. Application Data

(60) Provisional application No. 62/315,507, filed on Mar. 30, 2016.

(51) Int. Cl.
 *F16K 35/06* (2006.01)
 *F16K 1/22* (2006.01)
 *F16K 31/60* (2006.01)
(52) U.S. Cl.
 CPC ............... *F16K 35/06* (2013.01); *F16K 1/22* (2013.01); *F16K 31/602* (2013.01)
(58) Field of Classification Search
 None
 See application file for complete search history.

(56) References Cited

U.S. PATENT DOCUMENTS

| 1,783,621 | A | 1/1928 | Johnson |
| 5,842,681 | A | 12/1998 | Sisk |
| 6,314,993 | B1 | 11/2001 | Matthews et al. |
| 6,679,290 | B2 | 1/2004 | Matthews et al. |
| 6,786,362 | B2 | 9/2004 | Sisk |
| D673,657 | S | 1/2013 | Sisk |
| 9,909,705 | B2 | 3/2018 | Linhorst et al. |
| 2012/0261602 | A1* | 10/2012 | Sisk .......................... B60P 1/56 251/293 |
| 2013/0168956 | A1 | 7/2013 | Sisk |
| 2014/0110932 | A1* | 4/2014 | Gramling ............. B65D 90/623 285/126.1 |

OTHER PUBLICATIONS

Ultraflo Corporation, We Fit Your Needs to a TEE, Aug. 26, 2011, 1 page, Ultraflo Corporation, Ste. Genevieve, Missouri, United States.

* cited by examiner

*Primary Examiner* — Jessica Cahill
*Assistant Examiner* — Daphne M Barry
(74) *Attorney, Agent, or Firm* — Mark A. Oathout; Laura Tu; Oathout Law Firm

(57) ABSTRACT

An unload tee has a tee body with a front side and a rear side. The unload tee further includes a door rotatably connected to front side of the tee body; a catch pin mounted on and projecting from the door; a latch assembly connected to the door, and wherein the latch assembly is positioned towards the front side of the unload tee, and further wherein the latch assembly comprises a latch tab having an ear; and a catch defined as a curve in the ear of the latch tab, wherein the catch is configured to engage the catch pin when the door is in a closed position.

22 Claims, 23 Drawing Sheets

UNLOAD TEE

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A "SEQUENCE LISTING", A TABLE, OR A COMPUTER PROGRAM

Not Applicable.

BACKGROUND

Technical Field

Exemplary embodiments disclosed herein relate to techniques for unload tees used in transporting materials.

Unload tees are used in a variety of industries to transport and deliver bulk materials. Unload tees may be installed at the bottom of transportation vehicles (or other difficult to reach places) and further, conventional unload tees may be difficult to operate at certain angles or in certain situations. This may result in haphazard securing of the tee when delivery is complete, resulting in damage to the assembly and/or vehicle. Thus, there is a need for an improved unload tee that is secure, safe and allows for ease of operation.

BRIEF SUMMARY

An unload tee has a tee body with a front side and a rear side. The unload tee further includes a door rotatably connected to the front side of the tee body; a catch pin mounted on and projecting from the door; a latch assembly connected to the door, and wherein the latch assembly is positioned towards the front side of the unload tee, and further wherein the latch assembly comprises a latch tab having an ear; and a catch defined as a curve in the ear of the latch tab, wherein the catch is configured to engage the catch pin when the door is in a closed position.

The door is located on the very bottom of the tee body and is situated to cover an opening that extends from the very top through to the bottom, allowing for the passage of material through the tee. The door is pivotally connected to the 'front' of the tee body.

A snaking bar mounted to the latch assembly is positioned over the door, and is configured to slidably move across the door. A U-Bolt is mounted to the rear side of the tee body. The snaking bar is configured to engage the U-Bolt, which can selectively be used to engage or disengage the door.

BRIEF DESCRIPTION OF THE DRAWINGS

The exemplary embodiments may be better understood, and numerous objects, features, and advantages made apparent to those skilled in the art by referencing the accompanying drawings. These drawings are used to illustrate only exemplary embodiments, and are not to be considered limiting of its scope, for the disclosure may admit to other equally effective exemplary embodiments. The figures are not necessarily to scale and certain features and certain views of the figures may be shown exaggerated in scale or in schematic in the interest of clarity and conciseness.

DESCRIPTION OF EXEMPLARY EMBODIMENT(S)

The description that follows includes exemplary apparatus, methods, techniques, and instruction sequences that embody techniques of the inventive subject matter. However, it is understood that the described exemplary embodiments may be practiced without these specific details.

Figure 1:
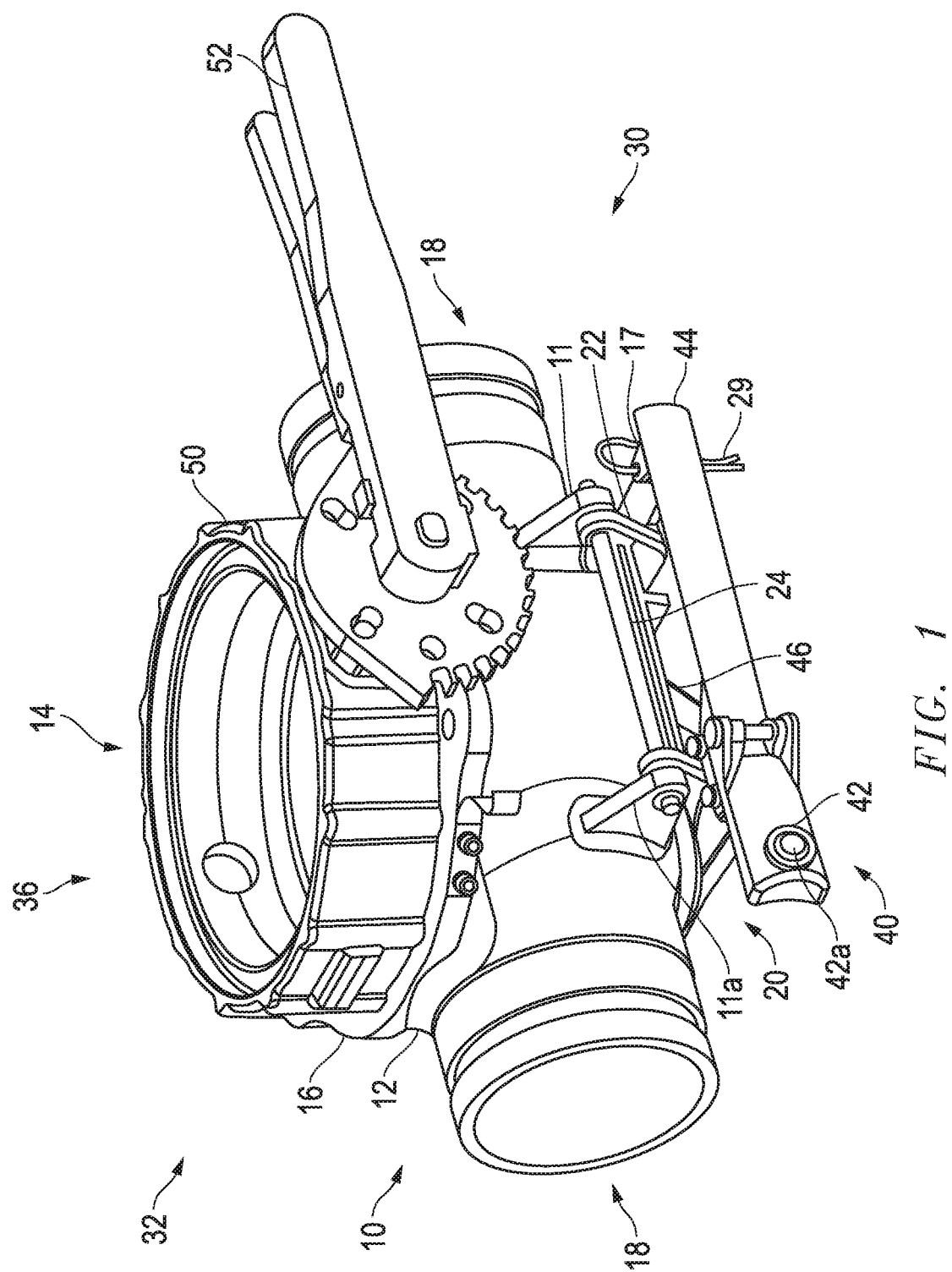
FIG. 1 depicts a side perspective view of an exemplary embodiment of an unload tee in a fully latched and fully closed position.
Figure 13:
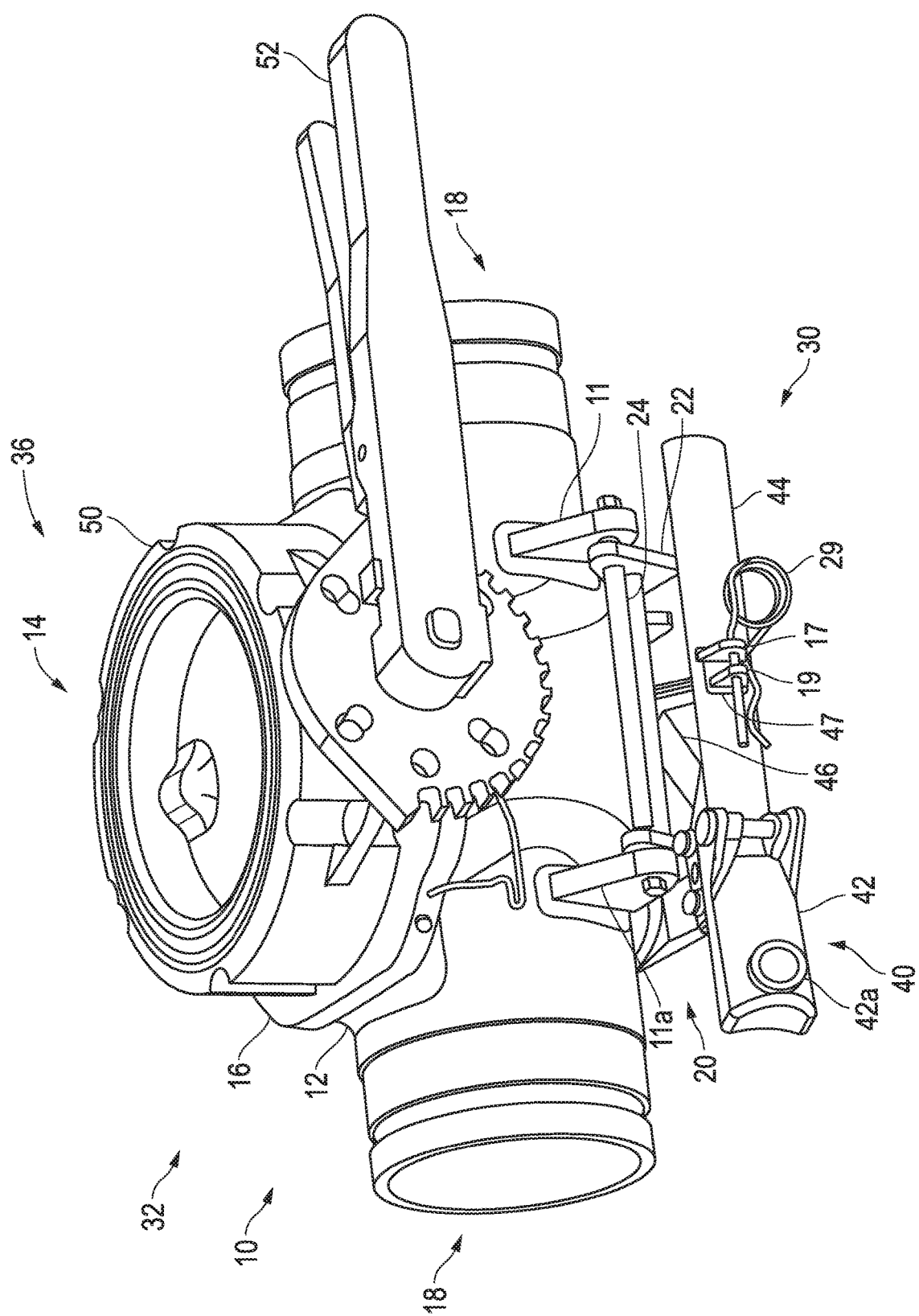
FIG. 13 depicts a side perspective view of an alternative exemplary embodiment of an unload tee in a fully latched and fully closed position.

FIGS. 1 and 13 depict side perspective views of exemplary embodiments of the unload tee 10 in a fully latched and fully closed position. The unload tee 10 may be used for the purpose of delivering a volume of material (not depicted) below a transportation vehicle (not depicted) and valve 50 (such as a butterfly valve) having a valve handle 52. The unload tee 10 has a tee body 12 which defines a bore 14 that travels through the tee body 12 from top side 36 to underside 34. As known to one having ordinary skill in the art, at one end of the bore 14 is a flange 16 configured for attaching or mounting to a controllable valve 50 (such as, for example, a butterfly valve) sandwiched between the flange 16 and a transportation vehicle/storage vessel (or other pipe or conduit system to which the unload tee 10 is connected). At the opposite end of the bore 14 from flange 16 (and forming part of the bore 14) is an opening 13, which is covered by the tee door or cover 25 when the unload tee 10 is in a closed position (see FIGS. 1 and 13). Further, the tee body 12 may have coupling ends 18 at an axis perpendicular to the bore 14. The coupling ends 18 as known to one having ordinary skill in the art may run along the vehicle/storage vessel and/or may connect the unload tee 10 for establishing flow along the vehicle to pipes, hoses, tees or other fittings as part of the materials transport or pipe system. The unload tee 10 may further be characterized by having a front or operating side 30 and a back or rear side 32. The operating or front side 30 may be the face, plane or side of the unload tee 10 that the operator of the transport or pipe system substantially interacts with to manipulate or change the position of the unload tee 10 and/or the control valve 50.

The unload tee 10 further includes a plurality of beams 11 which extend outwards from the tee body 12. The beams 11 may further be characterized into front beams 11a on the front side 30 to which a door assembly 20 is rotatably or pivotably coupled through a hinge bar 24, and rear beams 11b on the rear side 32 to which a U-Bolt 26 is mounted. Both front and rear beams 11a, 11b may both be located towards the lower end or underside 34 of the body 12 (or towards the opening 13 for the door 25). Views of the rear side of exemplary embodiments of the unload tee 10 are depicted in FIGS. 5-6 and FIGS. 17-18.

Figure 8:
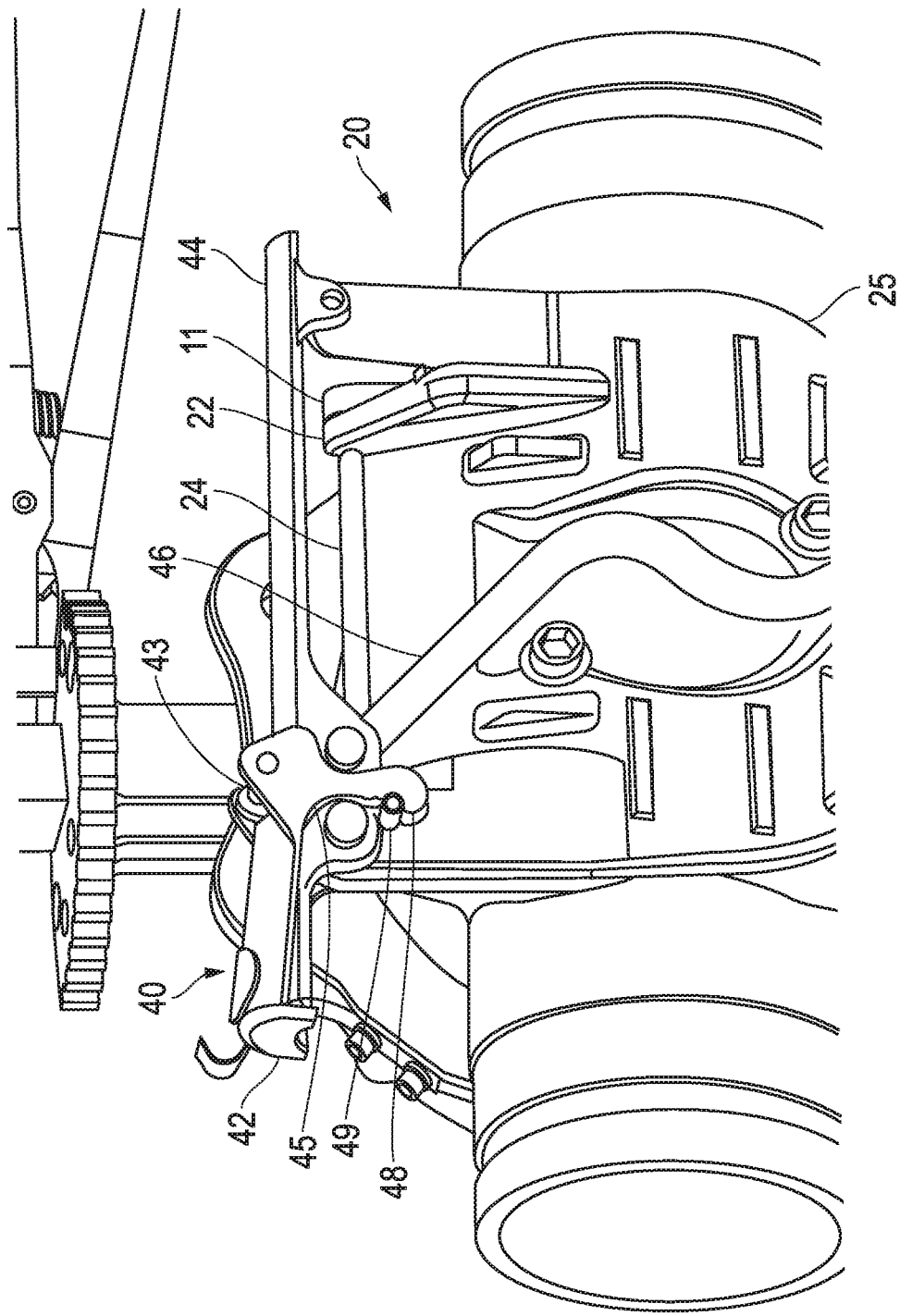
FIG. 8 depicts an enlarged bottom or underside view of an exemplary embodiment of an unload tee in a fully latched position.
Figure 9:
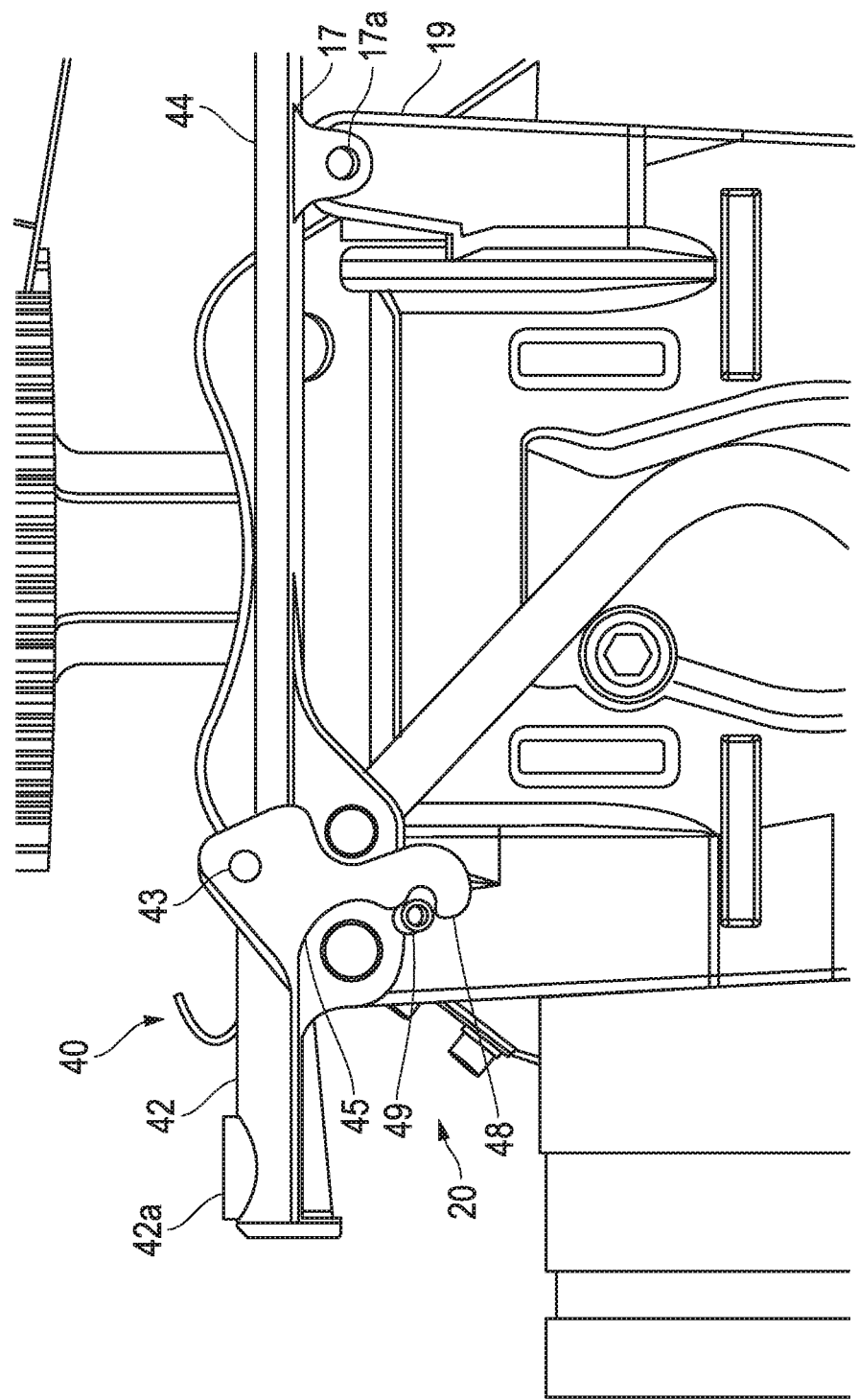
FIG. 9 depicts an enlarged bottom or underside view of an exemplary embodiment of an unload tee, wherein the catch is unlatched from the catch pin.
Figure 10:
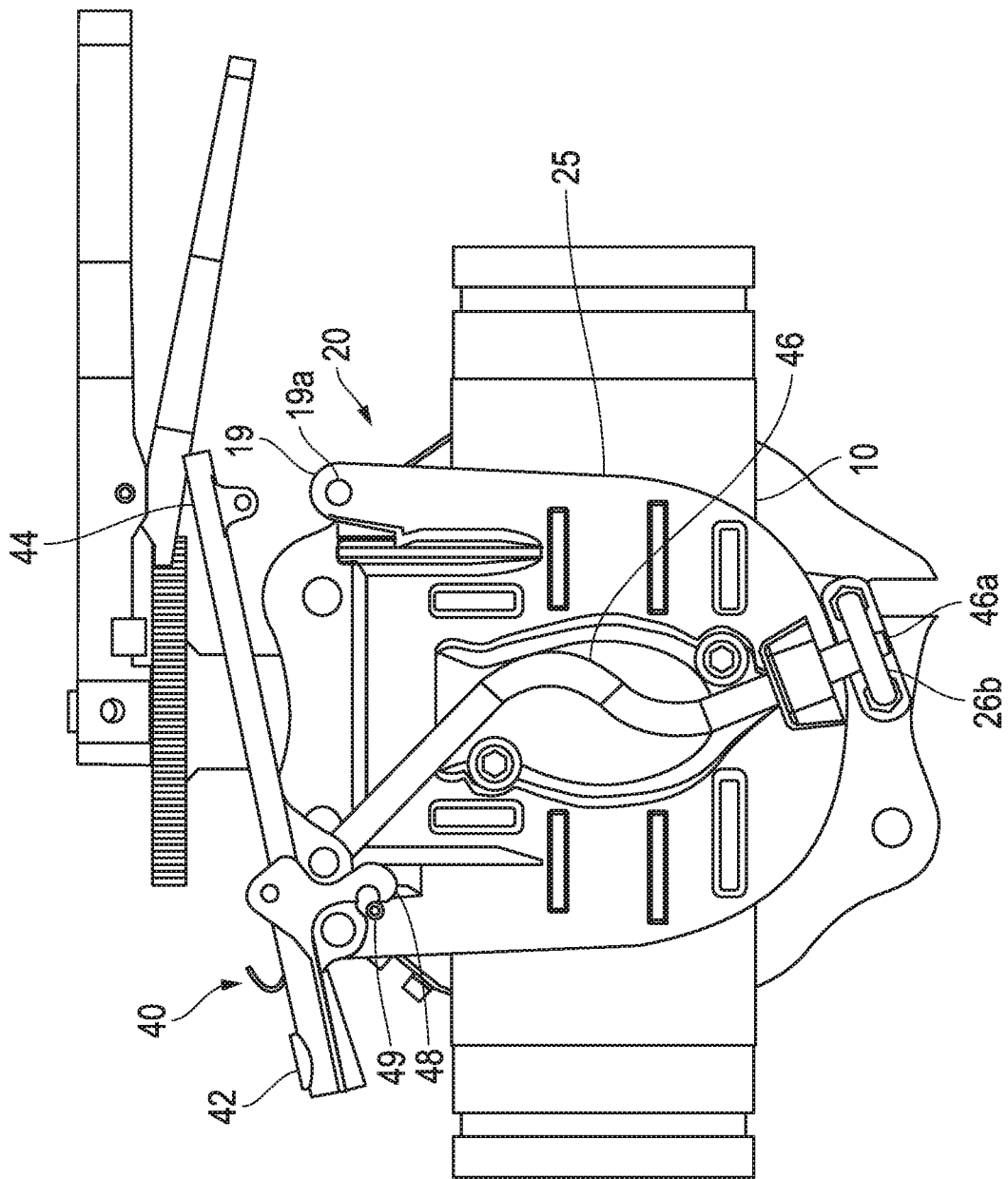
FIG. 10 depicts a bottom or underside view of an exemplary embodiment of an unload tee in a partially unlatched position.
Figure 11:
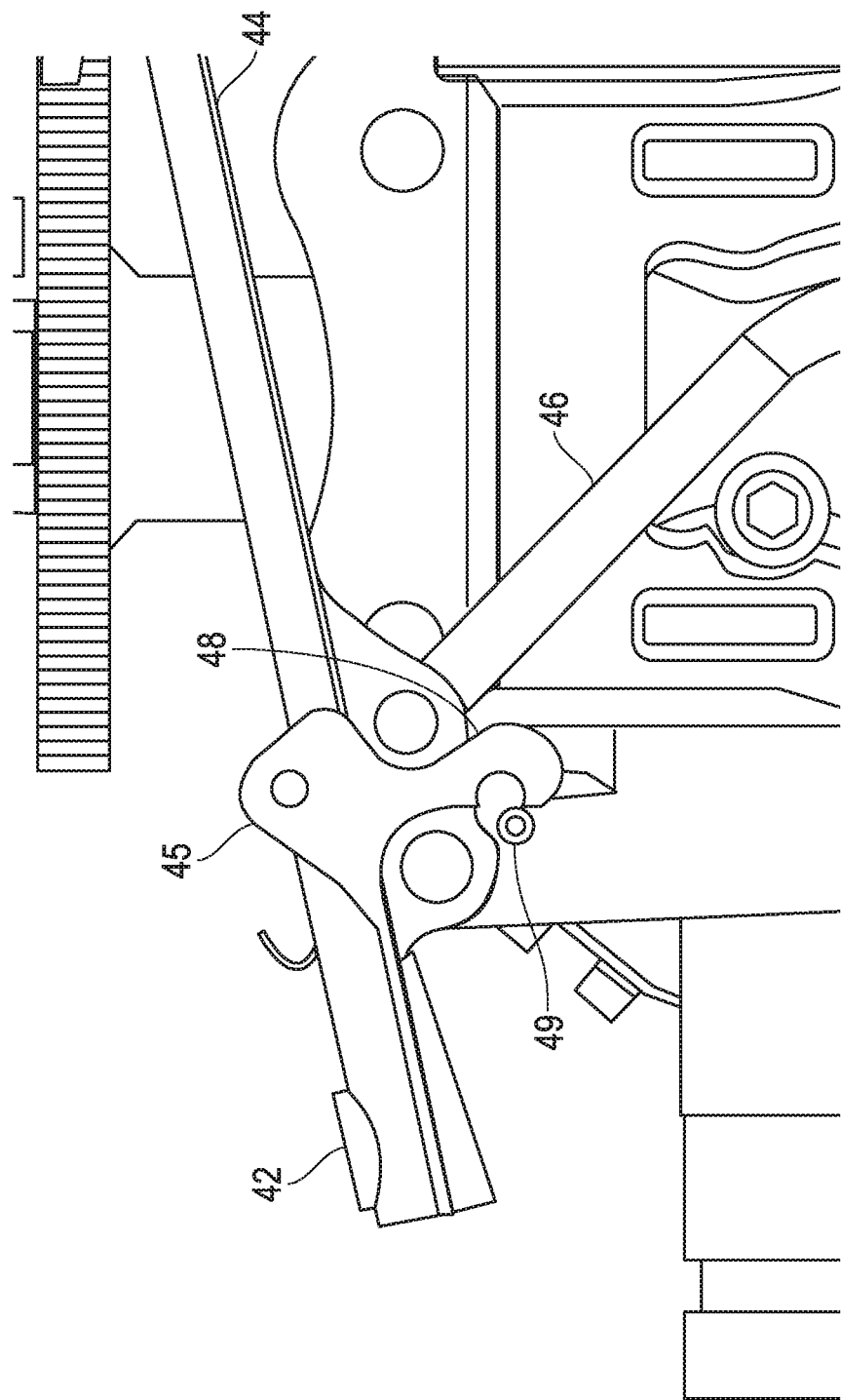
FIG. 11 depicts an enlarged bottom or underside view of an exemplary embodiment of an unload tee, wherein the catch is unlatched from the catch pin.
Figure 12:
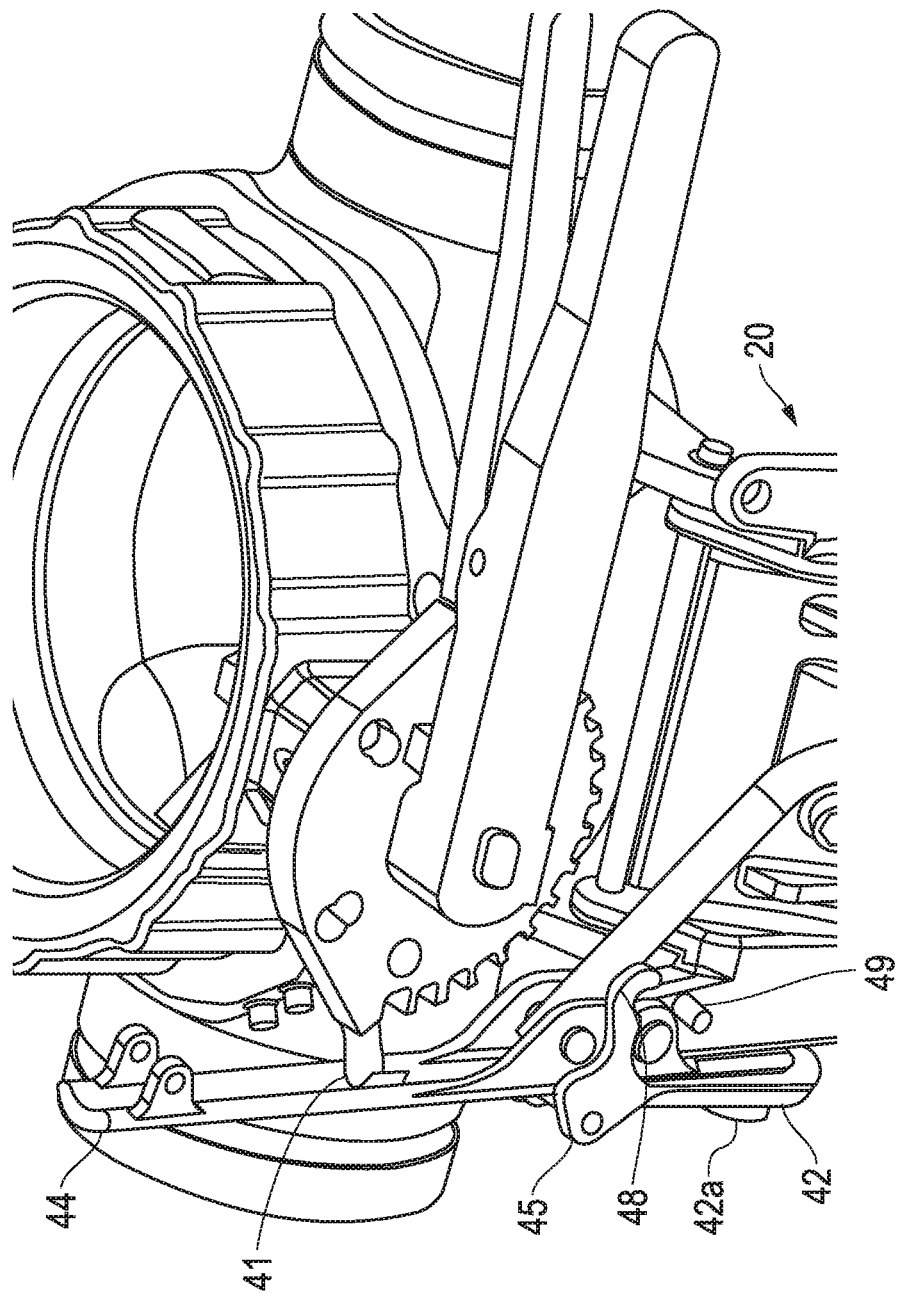
FIG. 12 depicts an enlarged side perspective view of an exemplary embodiment of an unload tee in a fully opened position.
Figure 20:
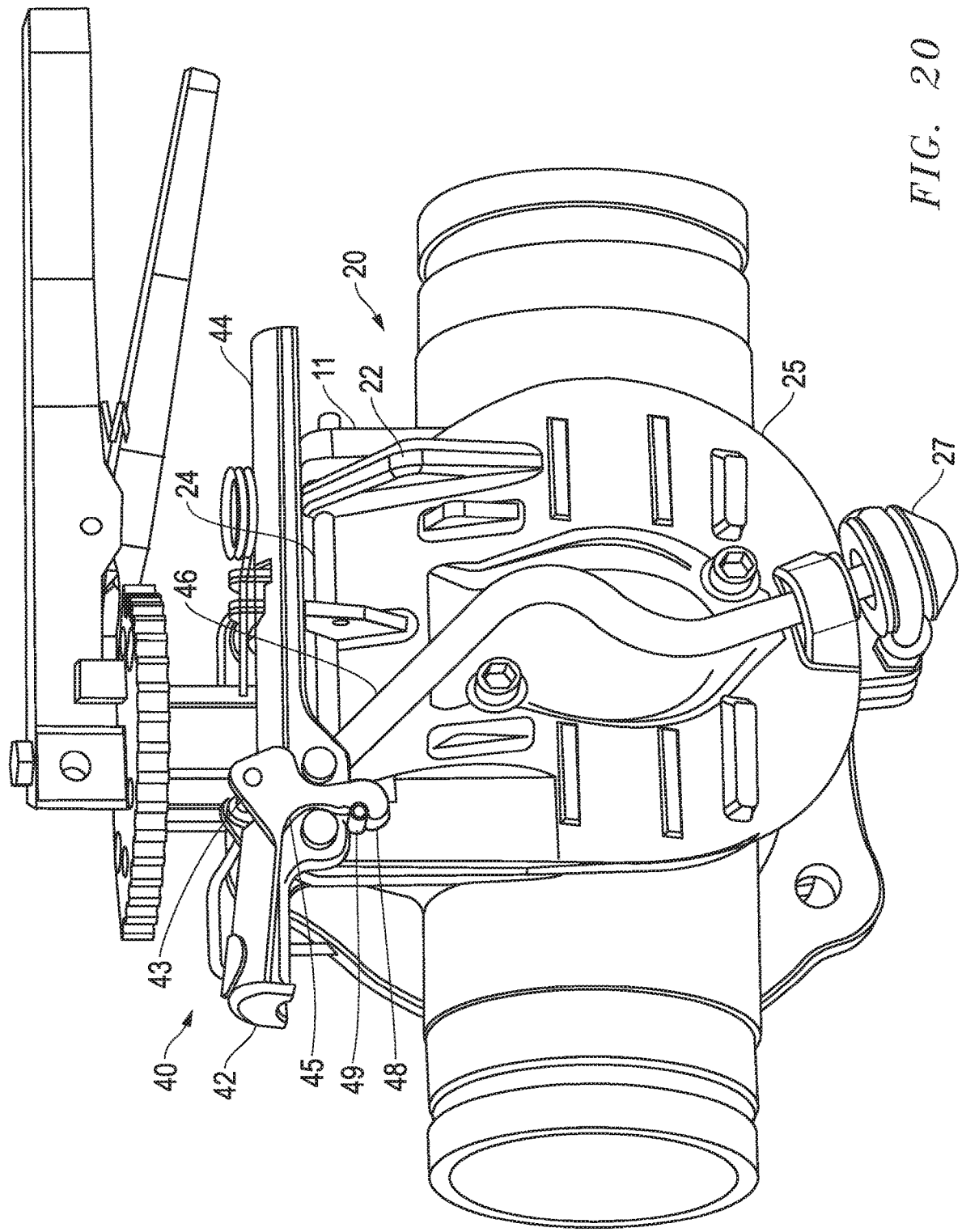
FIG. 20 depicts a bottom or underside view of an alternative exemplary embodiment of an unload tee in a fully latched position.
Figure 21:
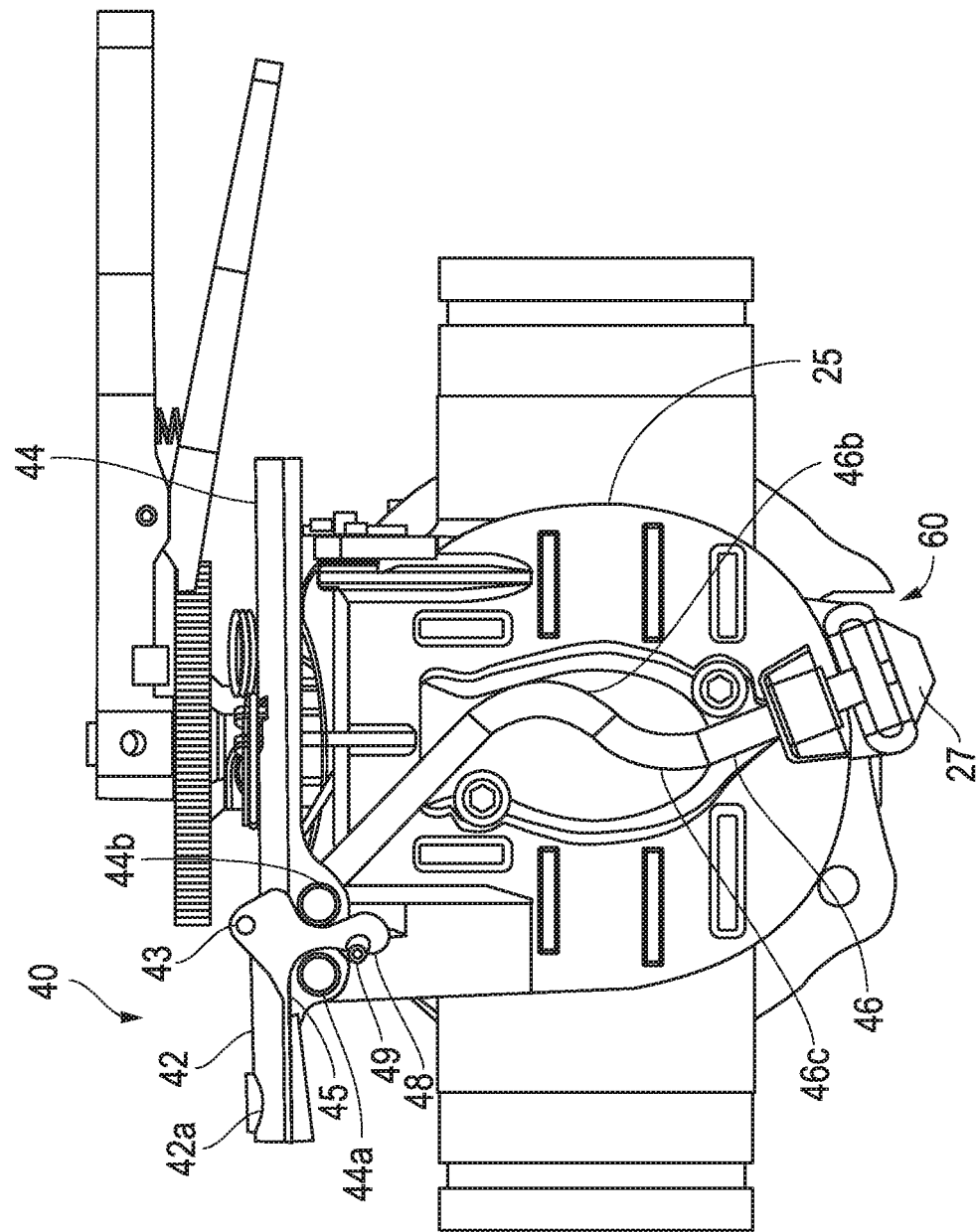
FIG. 21 depicts a bottom or underside view of an alternative exemplary embodiment of an unload tee, wherein the catch is unlatched from the catch pin.
Figure 22:
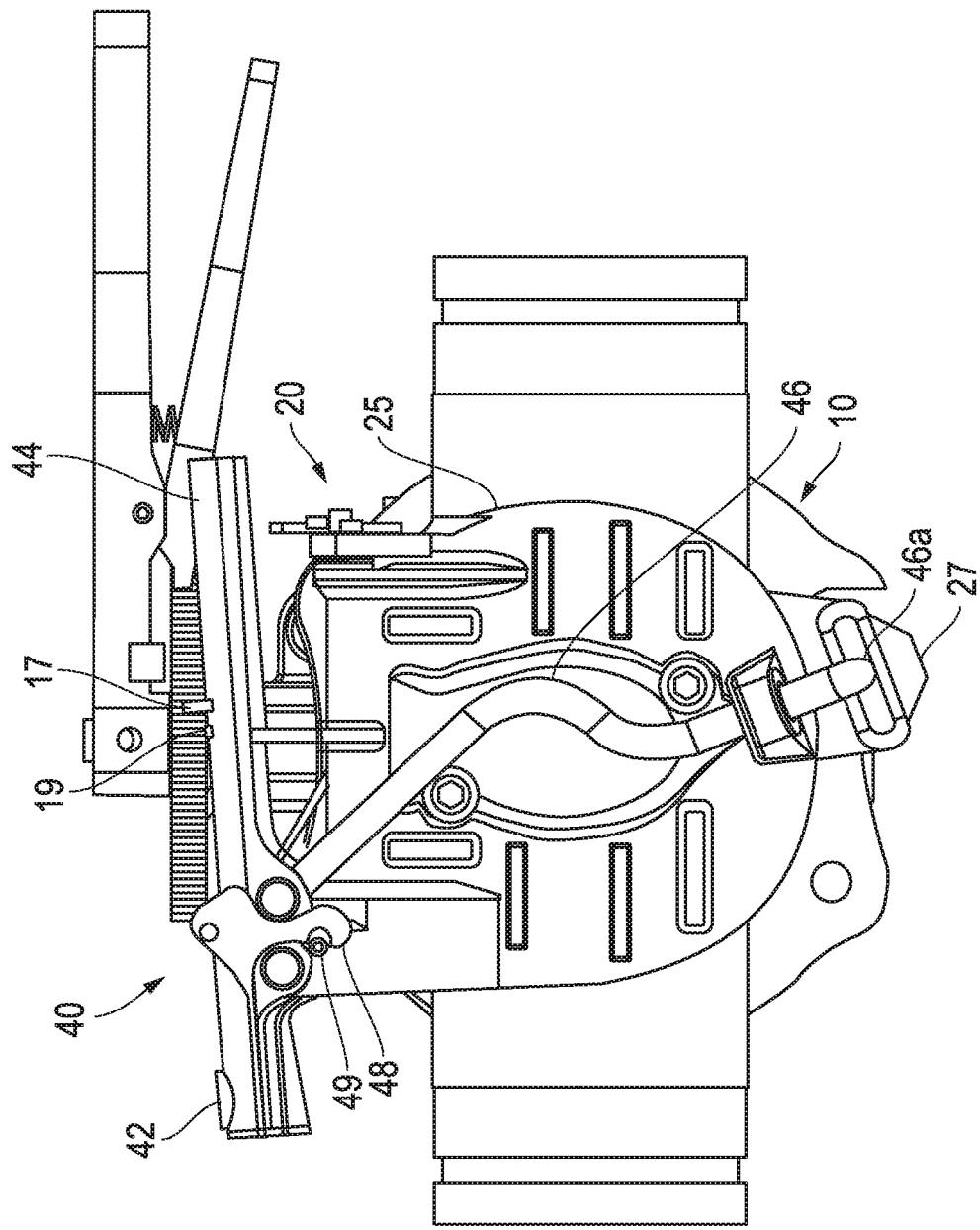
FIG. 22 depicts a bottom or underside view of an alternative exemplary embodiment of an unload tee in a partially unlatched and partially open position.
Figure 23:
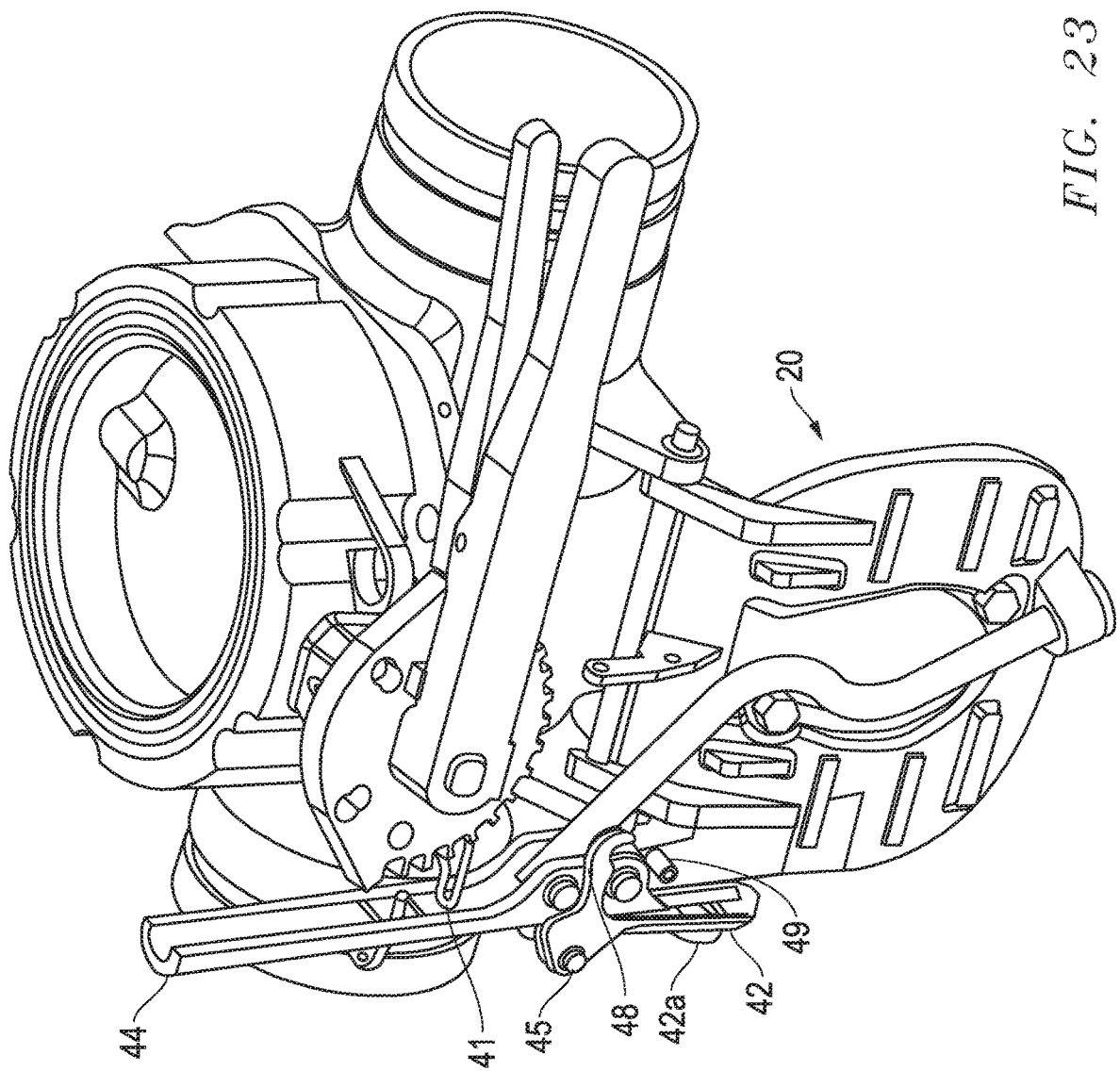
FIG. 23 depicts a side perspective view of an alternative exemplary embodiment of an unload tee in a fully opened position.

The door assembly 20 of the unload tee 10 in an exemplary embodiment includes a latch assembly 40, a door 25, arms 22, a hinge bar 24, a snaking bar 46, and a connection device 60 (mounted on the rear side 32 of the unload tee 10 in which exemplary embodiments of connection devices 60 include a U-Bolt 26, a bushing 27, a combination U-Bolt 26 and bushing 27, etc.). The latch assembly 40 includes a latch tab 42, a latch handle 44, a catch 48 and a catch pin 49. The catch 48 may be defined on an ear or projection 45 connected to or unitary with the latch tab 42. The catch 48, as depicted, is a curve or hook defined in the ear 45 that engages and disengages the catch pin 49, which is mounted on, or projects or protrudes from, the cover 25. Although the catch 48 is depicted as a curve or hook in the ear 45, other embodiments are possible. Enlarged views of the latch assembly 40 are depicted in FIGS. 8, 9, 11, and 12. FIGS. 8 and 20 depict the latch assembly 40, and the catch 48 and catch pin 49, in the fully latched position; FIGS. 9-11 and 21-22 depict the latch assembly 40 in partially unlatched positions (in FIG. 22 the engaging end 46a is sufficiently unlatched from the bushing 27 such that the door 20 can open and, as represented, is partially swung open), and FIGS. 12 and 23 depict the latch assembly 40 in a fully unlatched and fully open position. The latch tab 42 may further be biased to catch "closed" by, for example, including a biasing element 42a (such as, for example, a combination bolt with compression spring, or by mounting a torsion spring on latch tab hinge 43). When fully latched (see, e.g., FIG. 20) the latch tab 42 may offset/protrude from the latch handle 44 via biasing element 42a). Pressing latch tab 42 and consequently the biasing element 42a may motivate/pivot the ear 45 on which the catch 48 is defined so as to disengage the catch 48 with the catch pin 49 (or, when closing also may be used to assist in engaging catch 48 and catch pin 49 when the catch 48 and catch pin 49 are close enough together). The latch tab 42 may also be connected or hinged to the latch handle 44. Motivating the latch tab 42 may motivate or maneuver the latch handle 44. Maneuvering the latch handle 44 may motivate the latch tab 42 as well (e.g., as the catch pin 49 pushes and moves the outer rounded surface of catch 48), unless the catch 48 is engaged with the catch pin 49, and/or the ports 17a, 19a are secured with a fastener 29.

Figure 14:
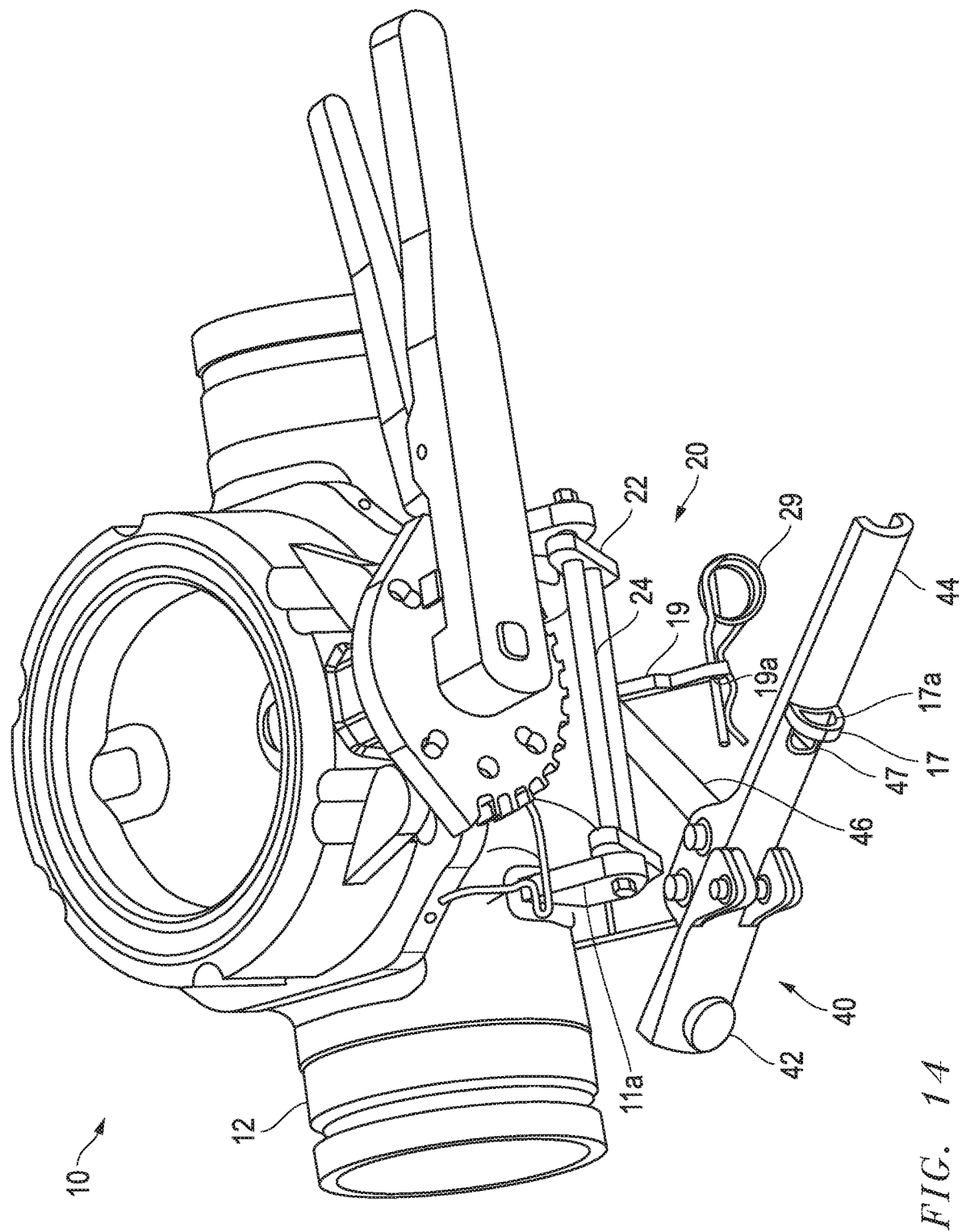
FIG. 14 depicts a top perspective view of an alternative exemplary embodiment of an unload tee in a partially unlatched position.

The latch handle 44 is rotatably or pivotably mounted or connected to the cover 25. The latch handle 44 may have a projection 17 defining a projection port 17a. A fastener or clevis pin 29 may be optionally inserted through the projection port 17a, and another port 19a defined on the cover 25 to secure the door assembly 20 of the unload tee 10 into a closed position. In a first exemplary embodiment, e.g. FIGS. 1-2, the projection 17 may be defined at an end of the latch handle 44 opposite the latch tab 42 and the projection 19 may be defined adjacent to a front beam 11a. In alternative exemplary embodiments, as depicted in FIGS. 13-14, the projection 17 may be defined towards the midpoint of the latch assembly 40 and/or latch handle 44, and adjacent to an opening 47 cut away from or defined on the latch handle 44. In these alternative exemplary embodiments of FIGS. 13-14, the projection 19 is defined on the cover 25 to extend through the opening 47 and align projection ports 19a and 17a, as defined on projections 19 and 17 respectively, so that the fastener 29 may be selectively inserted through ports 19a, 17a to secure/lock (elevationally out front in relation to a user) the door assembly 20 to the closed position.

As mentioned the latch handle 44 is rotatably or pivotably mounted or connected to the cover 25 (about a fixed pivot joint 44a). The latch handle 44 is also connected to a snaking bar 46 on the latch handle's 44 internal side. This latter connection occurs at another fixed pivot point 44b around which the latch handle 44 rotates whereupon/whereby the snaking bar 46 translates (enabling the latch handle 44 to selectively function as a type of a crank with respect to the snaking bar 46). The snaking bar 46 includes an engaging end 46a that may be inserted into a bushing 27 mounted to a curve 26b of the U-Bolt 26 when the unload tee 10 is in the closed position (see FIGS. 10 and 20). In an unlatched position of the unload tee 10 and the latch assembly 40, the engaging end 46a of the snaking bar 46 is disengaged from the U-Bolt 26. The snaking bar 46 may or may not include a plurality of curves or turns as desired, and should not be limited to the depicted embodiments (although in the depicted embodiments must function to convert rotational movement at one end to translational movement at the other end, whilst preferably exerting leverage). In the exemplary embodiments shown the snaking bar 26 has two consecutive and opposing curves 46*b* and 46*c* (bending generally greater than ninety degrees and less than one hundred and eighty degrees). The snaking bar 46 may also be guided or aligned towards the U-Bolt 26 by one or more cover guides 28 defined on the cover 25. These cover guides 28 may optionally include bearings and be in the form of holes through which the snaking bar 46 is inserted, or bolts which guide the curves of the snaking bar 46.

Figure 15:
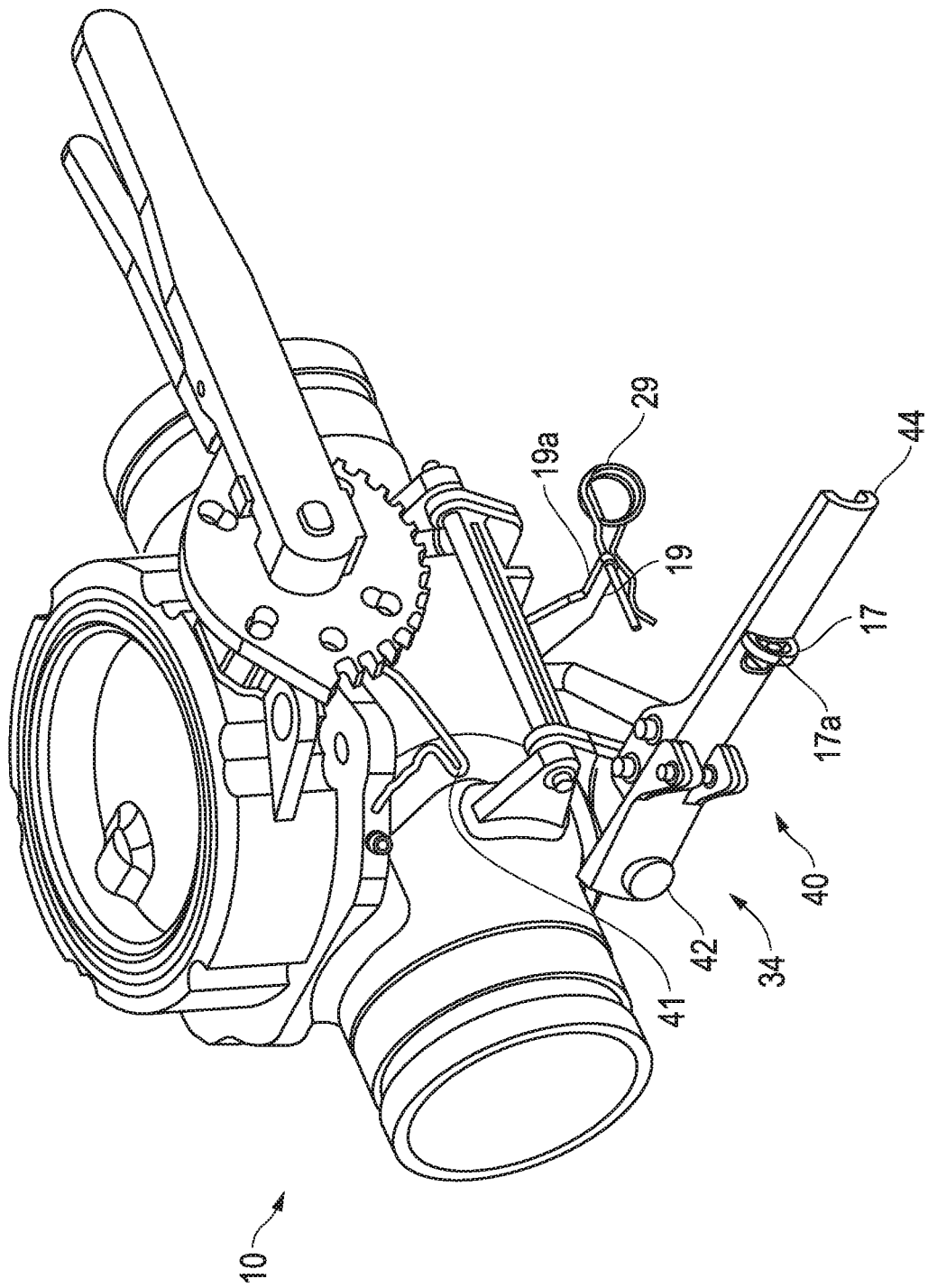
FIG. 15 depicts a side perspective view of an alternative exemplary embodiment of an unload tee in a fully unlatched position.
Figure 16:
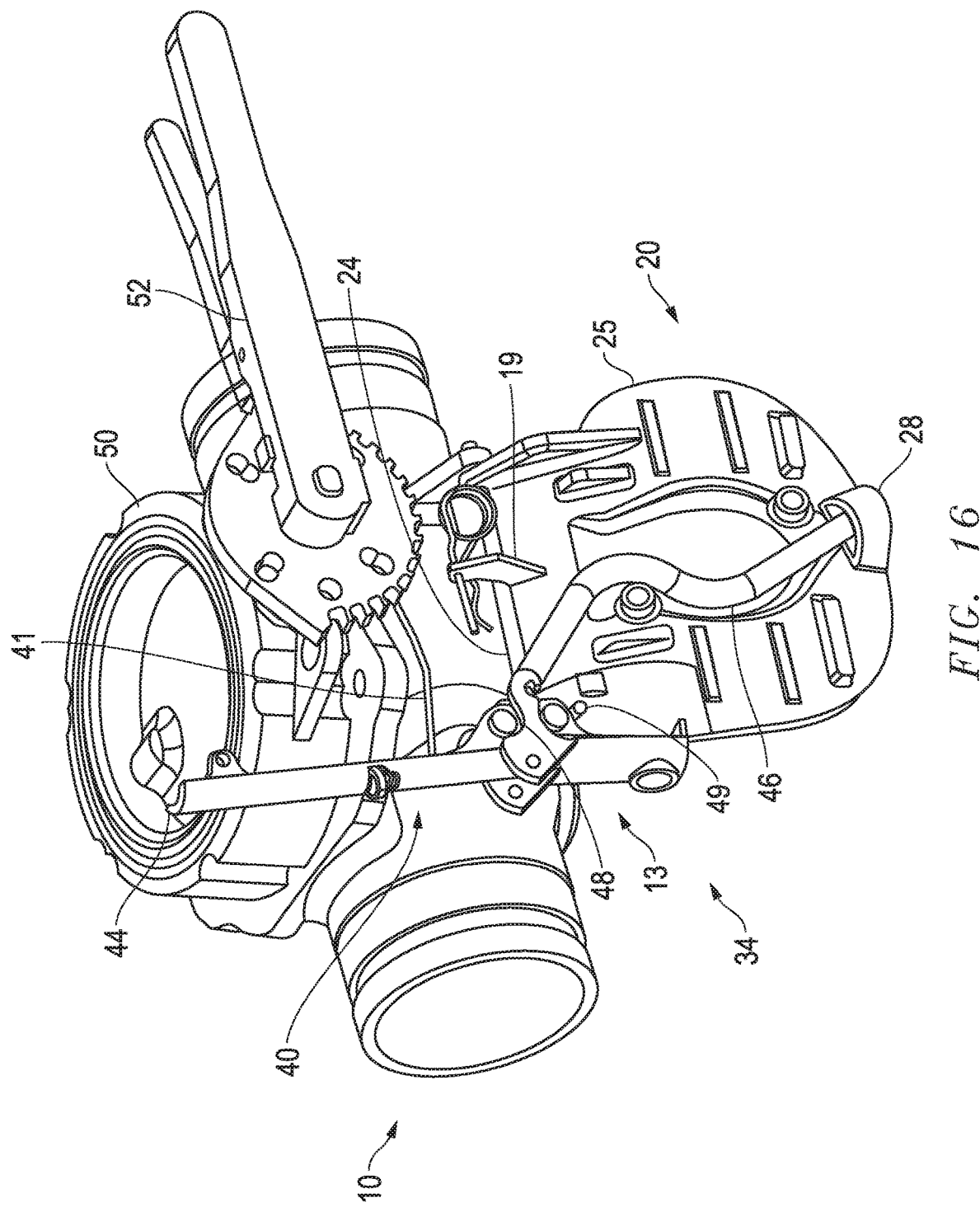
FIG. 16 depicts a side perspective view of an alternative exemplary embodiment of an unload tee in a fully unlatched and fully opened position.
Figure 17:
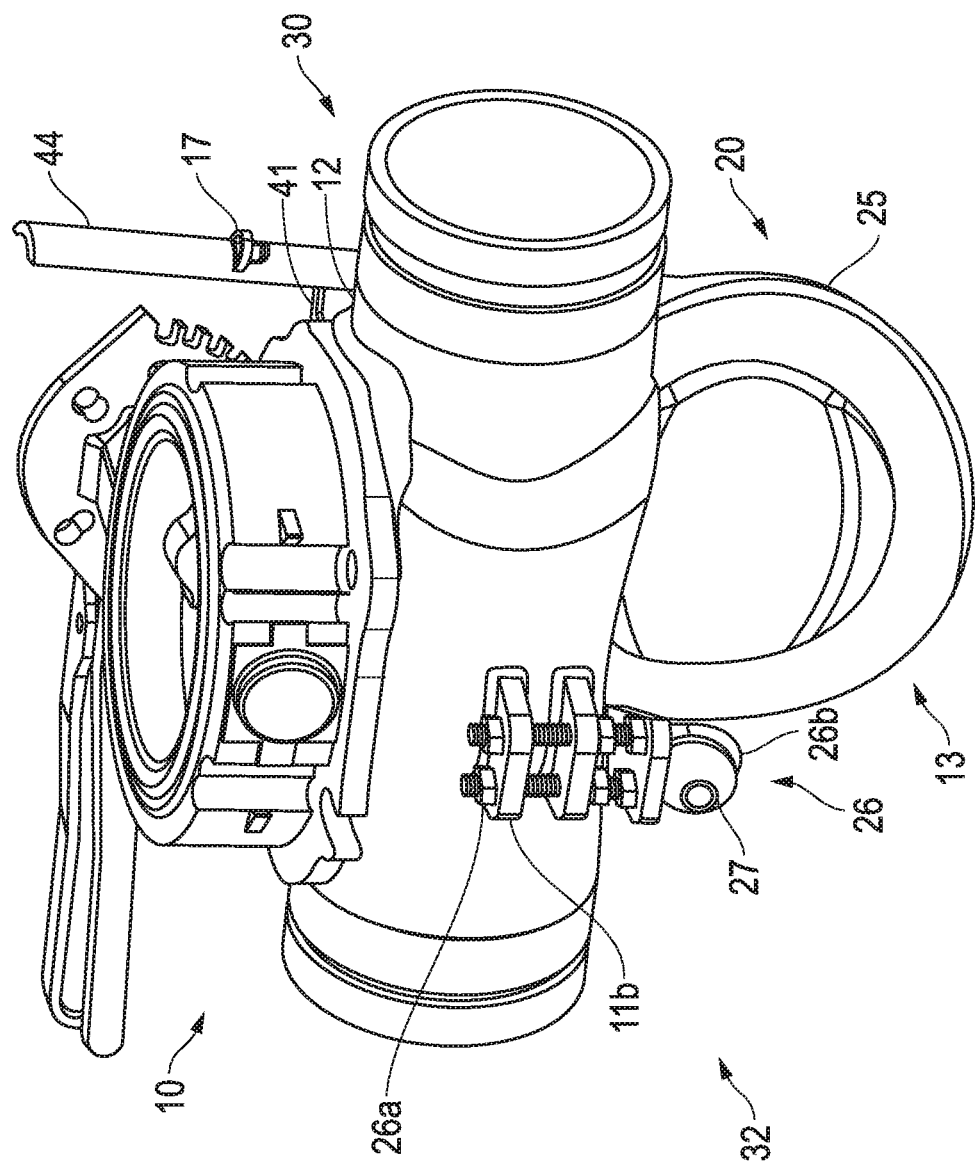
FIG. 17 depicts the opposite or back side view of FIG. 16, wherein an alternative exemplary embodiment of the unload tee is in a fully unlatched and fully opened position.
Figure 18:
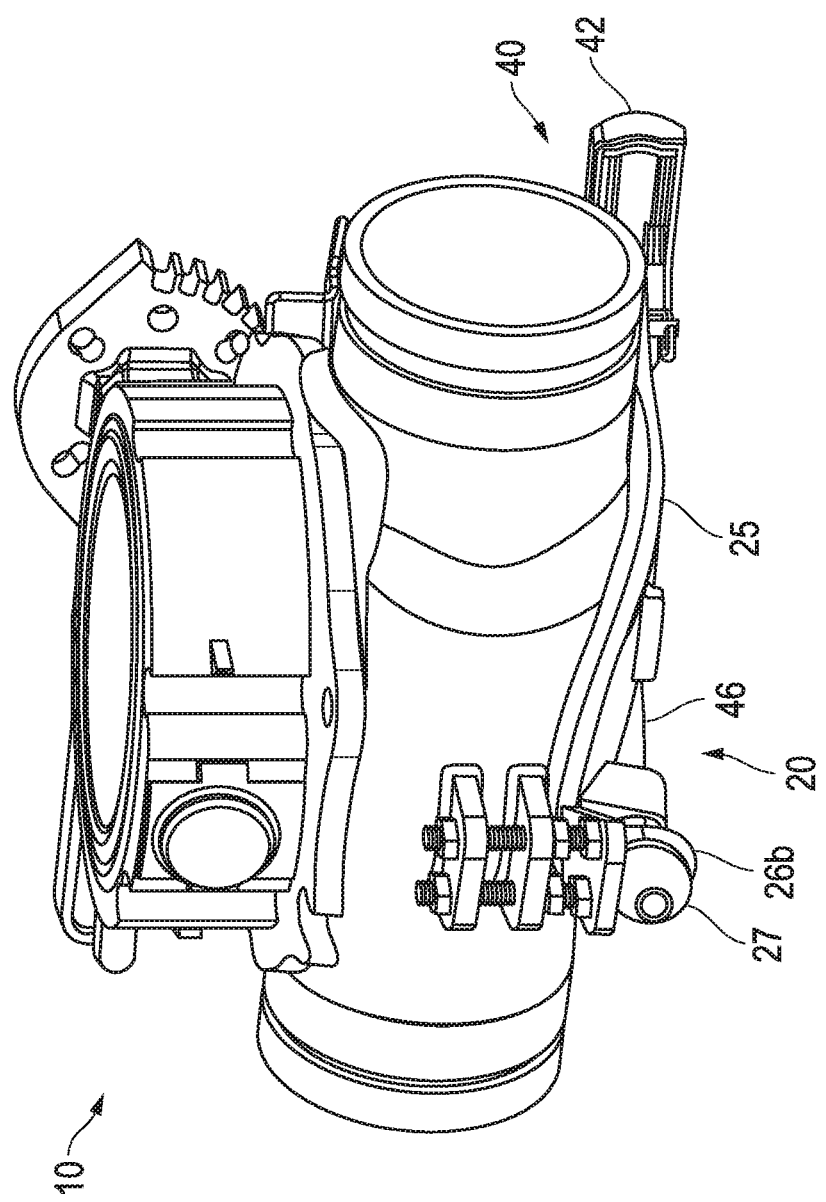
FIG. 18 depicts the opposite or back side view of FIG. 13, wherein an alternative exemplary embodiment of the unload tee is in a fully latched and fully closed position.

The latch assembly 40 also optionally includes a prop or handle locator 41 (see, e.g., FIG. 12 and FIGS. 15-16 & 23) which may be installed or bolted onto the flange 16. FIG. 12 depicts one exemplary embodiment of the prop 41, wherein the prop 41 is a curved piece of flat metal (or other material) mounted at one end on the flange 16, and FIGS. 15-16 & 23 depict an alternative exemplary embodiment of the prop 41, wherein the prop 41 is a piece(s) of rod, tubing or wire extending out at one end from the flange 16 and looping back to the tee body 12 at its opposite end. In all of the exemplary embodiments, the prop 41 is positioned and formed such that the latch handle 44 may rest on the prop 41 (and in FIG. 23 a U-bend of the prop 41 selectively acts as a keeper against/into a concave underside of latch handle 44) while the unload tee 10 is in the fully open position, to prevent the latch handle 44 from inadvertently closing the door assembly 20 to function as a handle 44 locator setting.

The hinge bar 24 of the door assembly 20 is installed through the arms 22 of the door assembly 20 and the front beams 11*a* of the tee body 12. The door or cover 25 rotates about the hinge bar 24 to open and close the door 25 over/across/from/in relation to the opening 13. As the door 25 rotates about the hinge bar 24, the latch assembly 40 may rotate as well (being connected to the door assembly 20). The door 25 itself may be of any shape so long as it completely closes against the opening 13 of the tee body 12 in the fully closed position, and in the open position of the unload tee 10, allows the desired material to be delivered without substantially inhibiting said delivery. The door 25 may also include a projection 19, which defines a projection port 19*a*. As described before, the projection port 19*a* may be secured to the latch handle 44 projection port 17*a* with a fastener 29 to further ensure safe transport of the material in the vehicle. Other means for safely securing the door assembly 20 to the tee body 12 in the closed position may be implemented as known to one having ordinary skill in the art.

Figure 5:
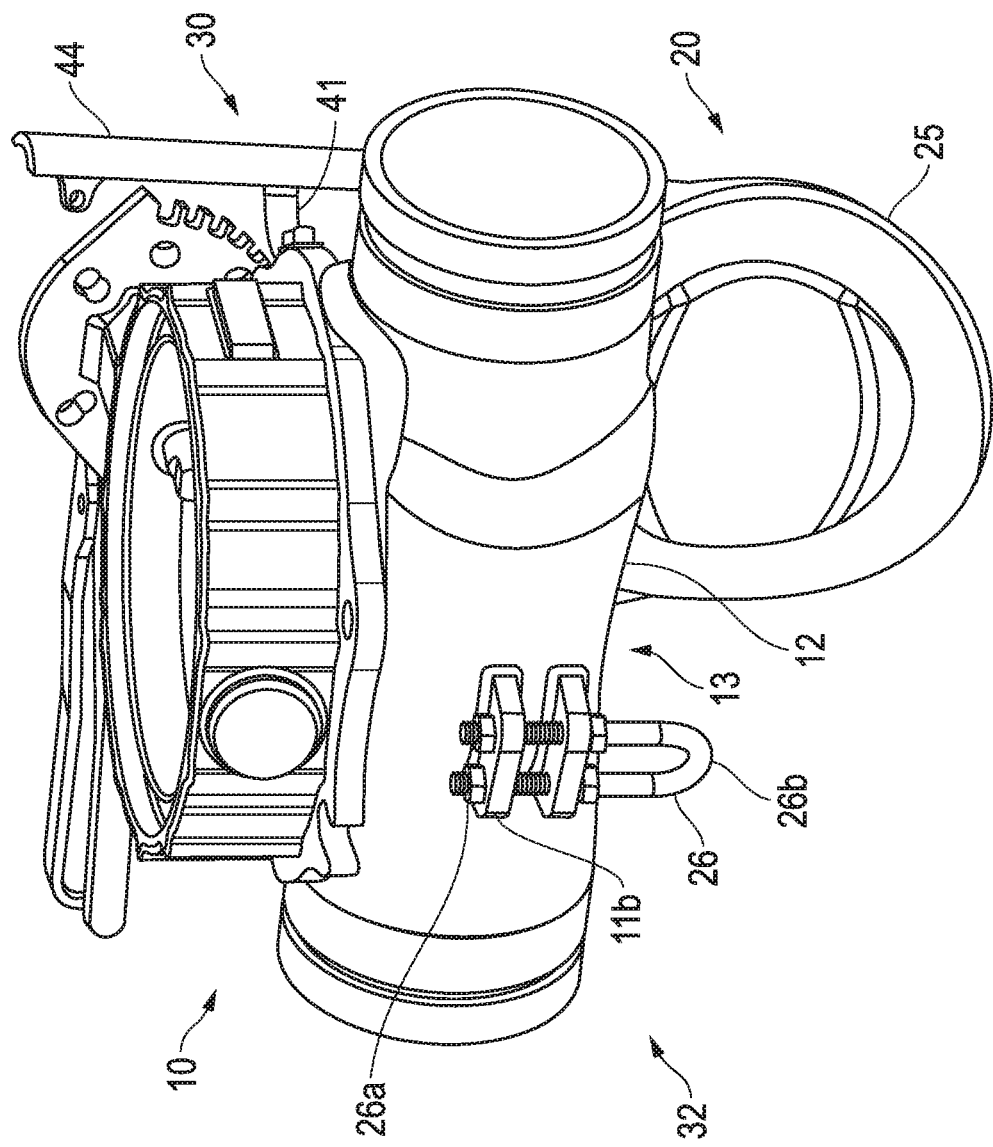
FIG. 5 depicts the opposite or back side view of FIG. 4, wherein an exemplary embodiment of the unload tee is in a fully unlatched and fully opened position.
Figure 6:
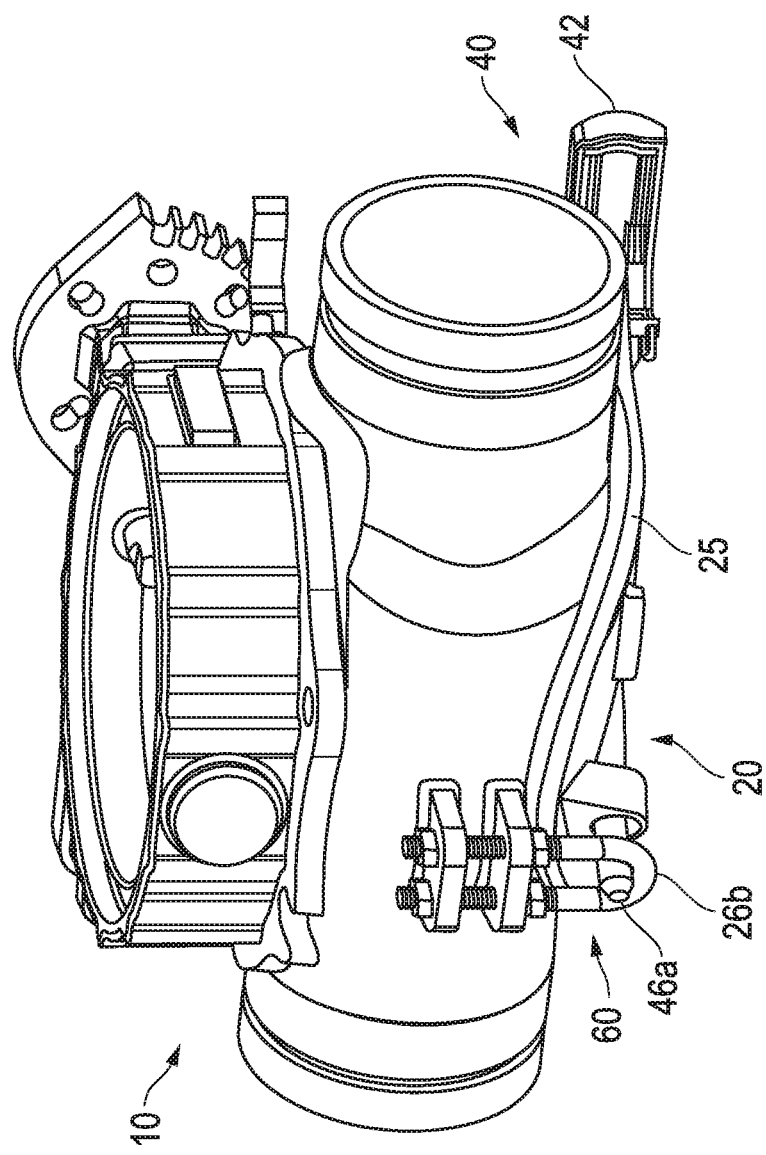
FIG. 6 depicts the opposite or back side view of FIG. 1, wherein an exemplary embodiment of the unload tee is in a fully latched and fully closed position.

Perspective views of a first exemplary embodiment of the U-Bolt 26 can be observed in FIGS. 5-6. A bottom view of the U-Bolt 26 can be observed in FIG. 7. The U-Bolt 26 is installed on the back or rear side 32 of the unload tee 10. The U-Bolt 26 may be threaded through one or more rear beams 11*b* (as depicted there are two rear beams 11*b*, one rear beam 11*b* on top of another rear beam 11*b*), having the curve or turn 26*b* of the U-Bolt facing downwards or towards the door assembly 20, or the underside or lower end 34 of the tee body 12. The curve 26*b* of the U-Bolt 26 should extend far enough past/beyond/below the door assembly 20 and underside 34 such that the engaging end 46*a* of the snaking bar 46 should be able to insert accordingly into the curve 26*b*. The position of the U-Bolt 26 may be secured to the rear beams 11*b* with a plurality of nuts 26*a*.

An alternative exemplary embodiment of the U-Bolt 26 is depicted in FIGS. 17-20. In these alternative exemplary embodiments, the U-Bolt 26 includes a bushing 27 installed or mounted on the curve 26*b* of the U-Bolt 26. In the alternative exemplary embodiments depicted in FIGS. 17-20, the engaging end 46*a* of the snaking bar 46 inserts into and resides within the bushing 27 instead of the curve 26*b* when the unload tee 10 is in the fully closed position (see FIGS. 18 and 20). The bushing 27 may serve to more securely stabilize the snaking bar 46 and protect the engaging end 46*a* (in this embodiment the engaging end 46*a* must slide through/into the bushing 27 and the U-Bolt 26 to latch.

Figure 2:
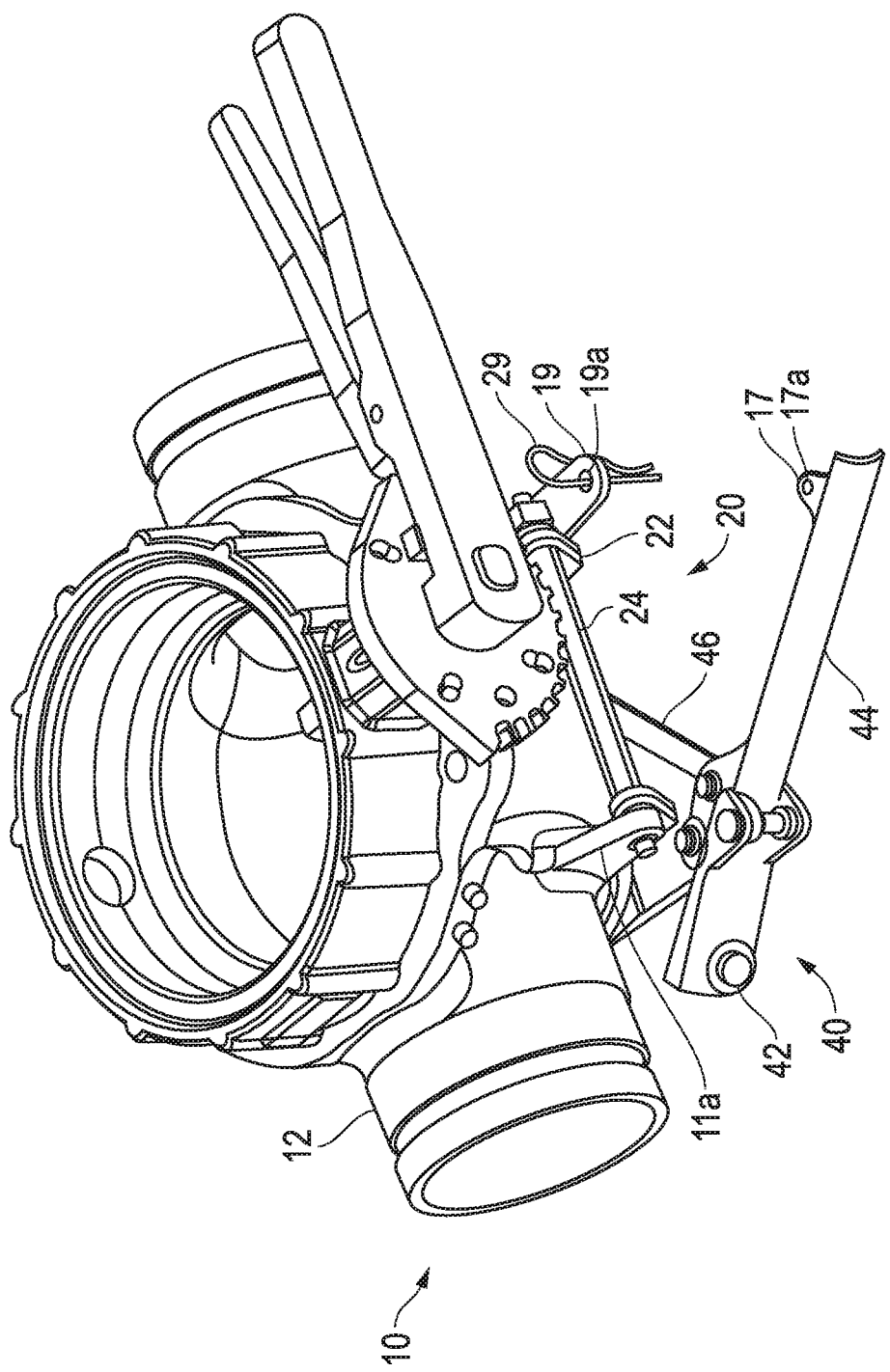
FIG. 2 depicts a top perspective view of an exemplary embodiment of an unload tee in a partially unlatched position.
Figure 3:
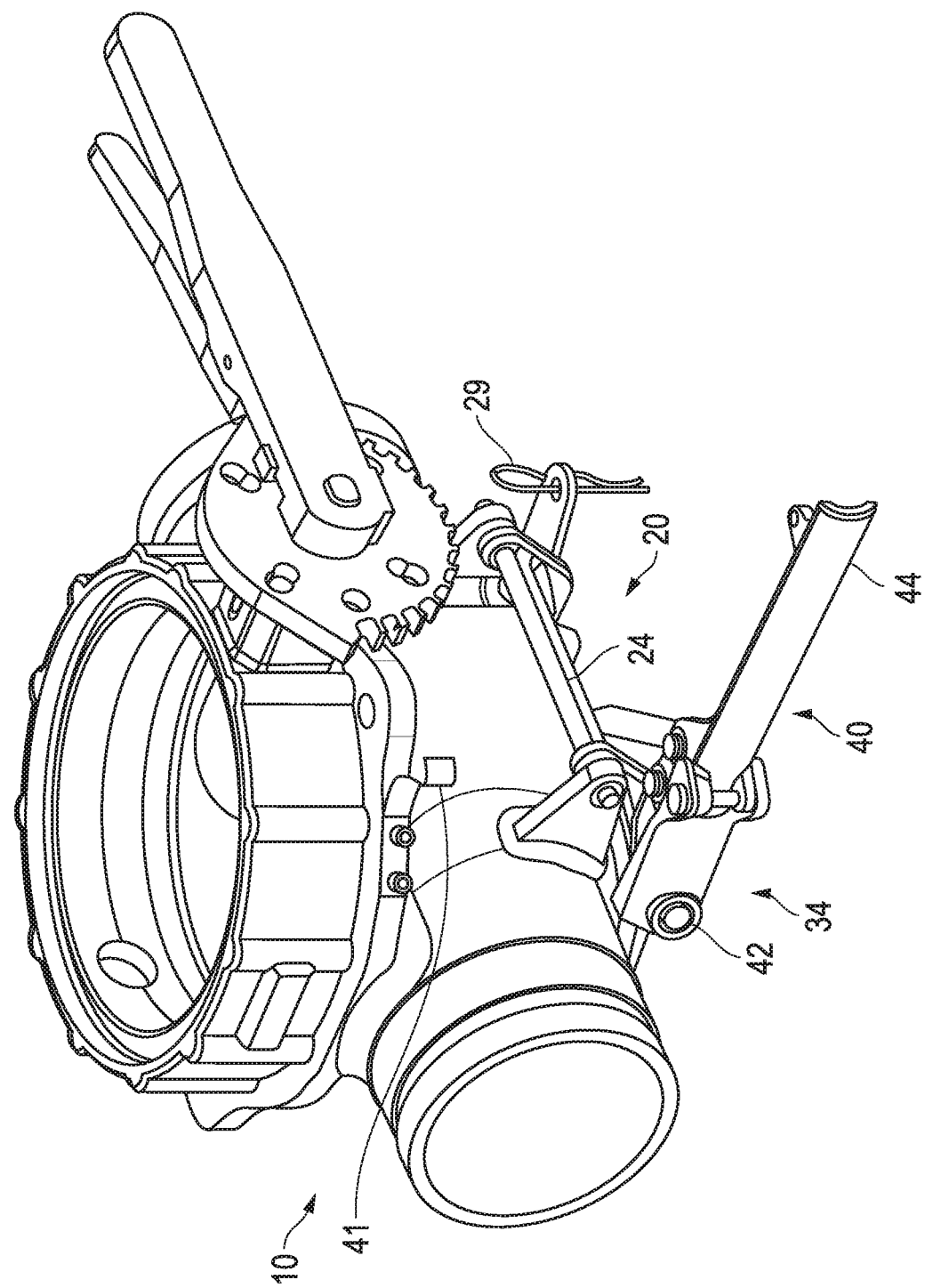
FIG. 3 depicts a side perspective view of an exemplary embodiment of an unload tee in a fully unlatched position.
Figure 7:
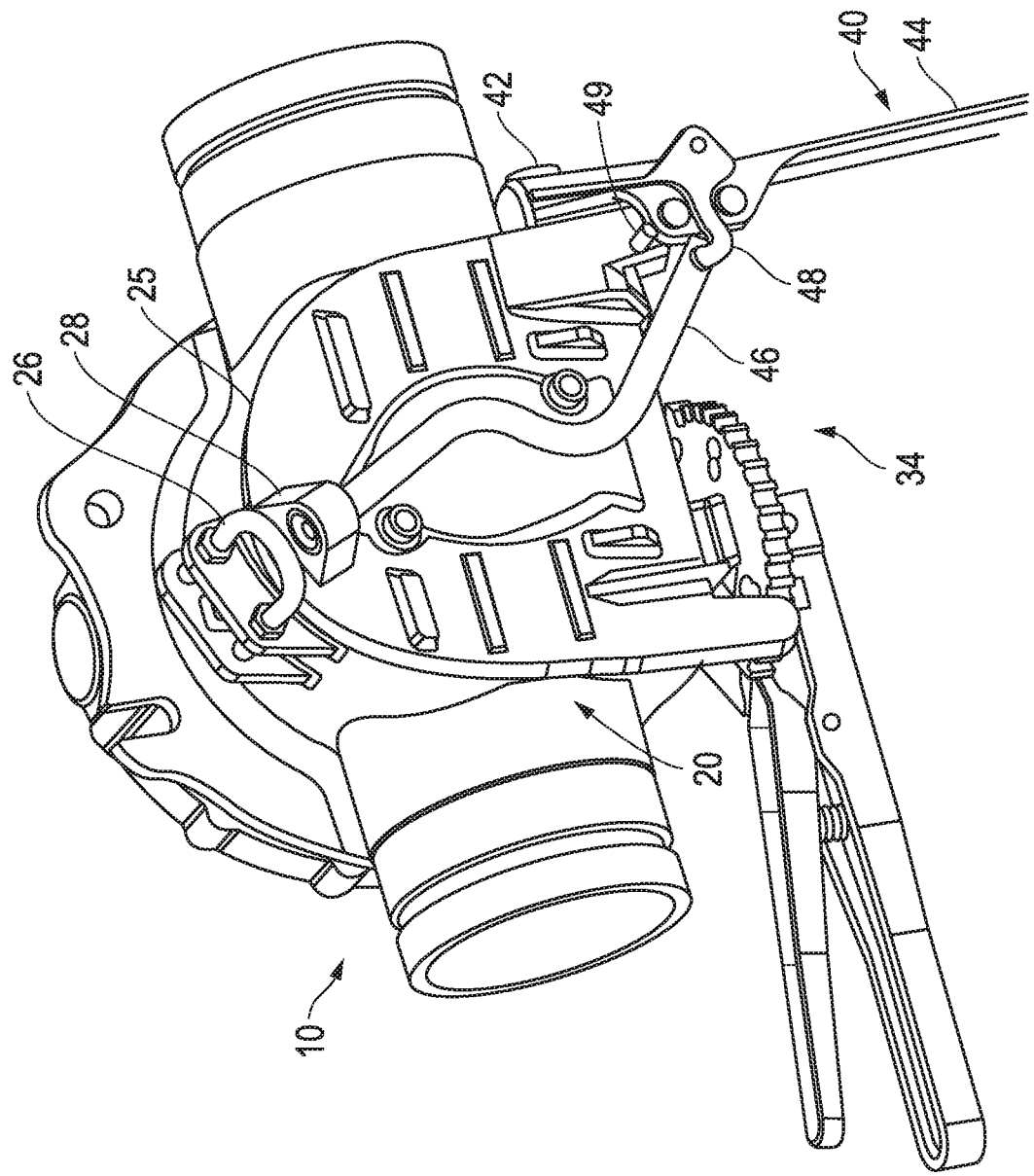
FIG. 7 depicts a bottom or underside view of FIG. 3, wherein an exemplary embodiment of the unload tee is in a fully unlatched position.
Figure 19:
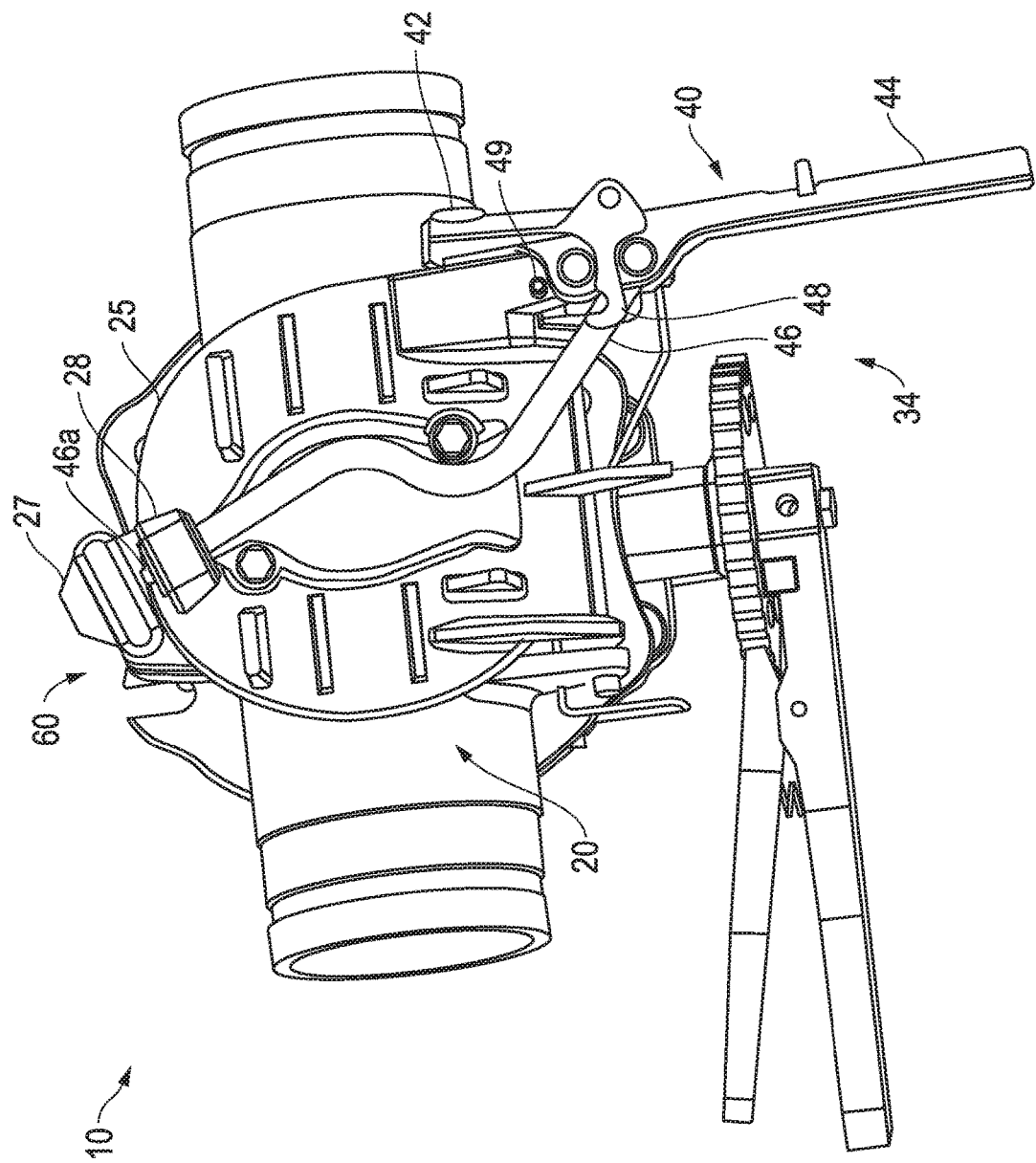
FIG. 19 depicts a bottom or underside view of FIG. 15, wherein an alternative exemplary embodiment of the unload tee is in a fully unlatched position.

To open the unload tee 10 from a fully closed position (as seen in FIGS. 1, 6 and 13), the fastener 29, if present, must first be removed from fastener ports 17*a*, 19*a*. As shown in FIGS. 2-3 and 14-15, the fastener 29 can be re-inserted into fastener port 19*a* (or alternatively, fastener port 17*a*), for safekeeping while further operating the unload tee 10 to an open position. Next, pushing the latch tab 42, and consequently the biasing element 42*a*, disengages the catch 48 from the catch pin 49 (see FIGS. 9 and 21). Then, the latch handle 44 can be pulled towards the operator of the unload tee (e.g. vehicle operator) and upwards (see FIGS. 10-11 and 22-23). As the snaking bar 46 is connectably engaged with the latch handle 44, pulling movement of the latch handle 44 also retreats the snaking bar 46 out of the curve 26*b* and/or bushing 27 of the U-Bolt 26 (i.e. the snaking bar 46 converts rotational movement at one end to translational movement at the other end). FIGS. 2 and 14 also depict exemplary embodiments of the unload tee 10 in a partially unlatched position. Additional pulling of the latch handle 44 by the operator moves the unload tee 10 into the fully unlatched position as shown in FIGS. 3 and 15, and moves the engaging end 46*a* of the snaking bar 46 farther away from the U-Bolt 26 as shown in FIGS. 7 and 19. From the partially unlatched to the fully unlatched position of the latch assembly 40, the door 25 rotates about the hinge bar 24, due to the effects of gravity, to a fully open position (as accurately seen in FIGS. 4-5 and 16-17 assuming no back-force exerted by the operator and typical mounting on a transportation vehicle) after the engaging end 46*a* leaves the curve 26*b* and/or bushing 27 of the U-Bolt 26. The latch assembly 40, including the latch tab 42 and latch handle 44, may also rotate as the door 25 is opened. Alternatively or additionally, the operator may also push/pull/swing the latch handle 44 upwards (or away from the underside 34 of the tee body 12) to provide additional rotational force to open the door 25. Moreover, the latch handle 44 may be maintained in the unlatched, open position by resting the internal sides of the latch handle 44 against the prop 41, as shown in the enlarged view of FIG. 12, or in the view shown in FIG. 23. The valve handle 52 (or any other type of actuator for the valve 50) may be operated to unload the material to the desired destination for said material.

Figure 4:
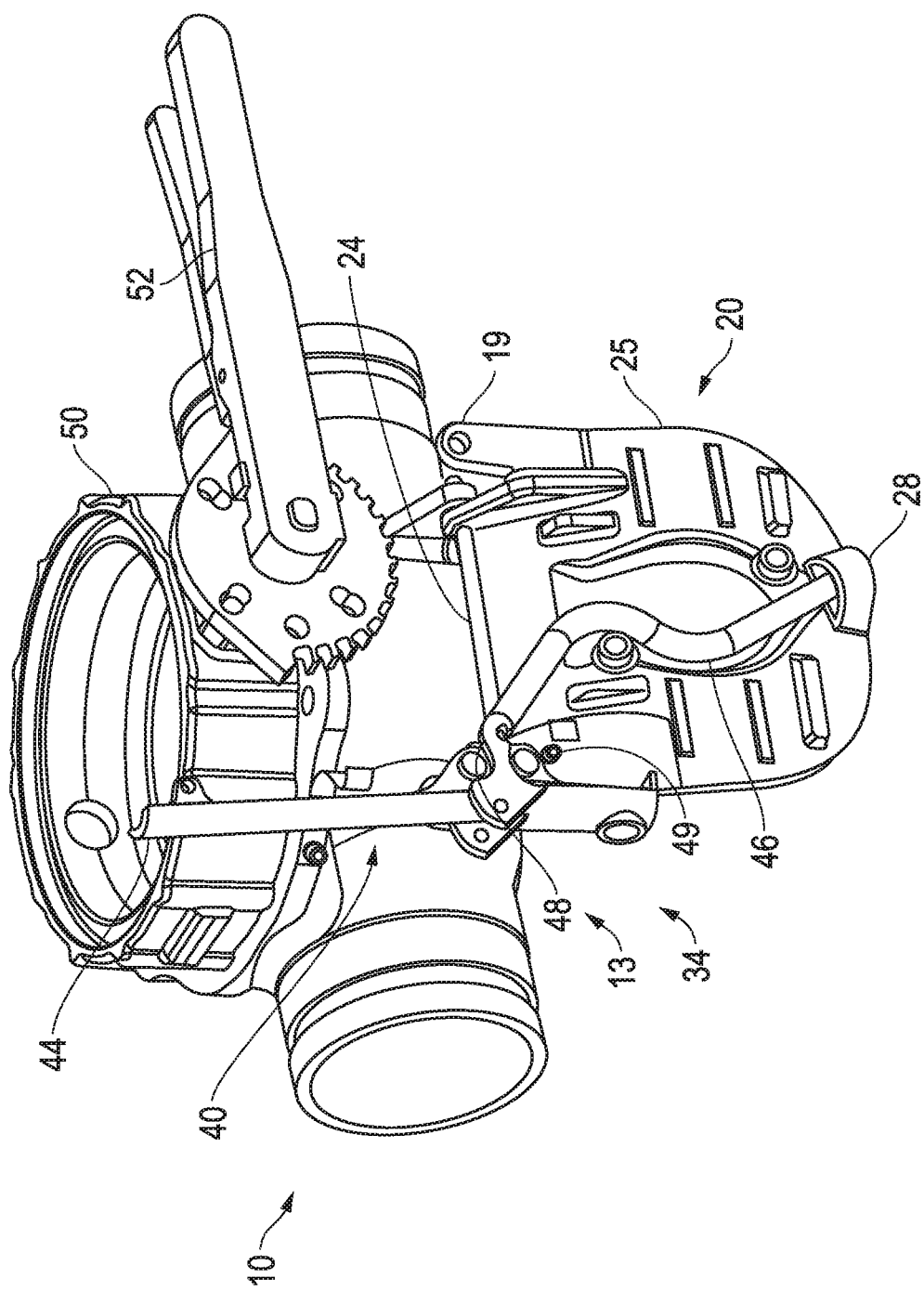
FIG. 4 depicts a side perspective view of an exemplary embodiment of an unload tee in a fully unlatched and fully opened position.

To close a fully opened exemplary embodiment of the unload tee 10, first the valve 50 may be actuated to 'closed' by the valve handle 52 to prevent further material from coming through the opening 13. Then the latch handle 44 may be rotated downwards from the 'open' position, as depicted in FIGS. 4 and 16, and then around the axis of the hinge bar 24 as the door assembly 20 pivots towards the closed position. The door 25 swings about the hinge bar 24 towards the 'closed' position as the latch handle 44 is rotated downward, and moves towards 'closed' position due to rotational force from the operator. As the latch handle 44, and thus the latch tab 42 is moved further towards the fully closed position, the catch 48 will automatically reengage the catch pin 49. Additionally, throughout the closing procedure, the engaging end 46*a* of the snaking bar 46 will also gradually move to insert into the curve 26*b* and/or bushing 27 of the U-Bolt 26, while the snaking bar 46 optionally moves through the cover guide 28. The fastener or clevis pin 29 may then be used to insert through aligned projection ports 17a, 19a to secure the unload tee 10 into the fully closed position.

While the exemplary embodiments are described with reference to various implementations and exploitations, it will be understood that these exemplary embodiments are illustrative and that the scope of the inventive subject matter is not limited to them. Many variations, modifications, additions and improvements are possible. For example, while the implementations and techniques used herein are discussed primarily in relation to the bulk handling transportation industries, alternative exemplary embodiments of the unload tee 10 may be applied to alternate industries, such as, by way of example only, petrochemical, irrigation, food and beverage industries and the like.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. An unload tee apparatus having a tee body with a front side and a rear side, comprising:
   a door rotatably connected at the front side of the tee body;
   a catch pin mounted on and projecting from the door;
   a latch assembly connected to the door, and wherein the latch assembly is positioned towards the front side of the tee body, and further wherein the latch assembly comprises a latch tab having an ear;
   a catch defined as a curve in the ear of the latch tab, wherein the catch is configured to engage the catch pin when the door is in a closed position;
   wherein the latch assembly further comprises a latch handle connected to the latch tab, wherein the latch handle is connected at an end of the latch tab opposite the ear;
   wherein the latch assembly further comprises a snaking bar joined to the latch handle at a first end of the snaking bar, wherein said snaking bar is positioned over the door, and is configured to slidably move across the door; a connection device mounted on the rear side of the tee body for connecting to a second end of said snaking bar; and
   wherein the connection device is selected from the group consisting of a U-Bolt having a curve, a bushing, and a combination of the U-Bolt and the bushing installed on the curve of the U-Bolt.

2. The unload tee apparatus according to claim 1, wherein said snaking bar is configured to engage the connection device at an engaging end of said snaking bar.

3. The unload tee apparatus according to claim 2, further comprising
   an opening defined on the latch handle;
   a first projection extending from the latch handle and adjacent to the opening, wherein the first projection defines a first port;
   a second projection extending from the door, wherein the second projection defines a second port and further wherein the second projection is configured to extend through the opening when the door is in the closed position.

4. The unload tee apparatus according to claim 3, further comprising a fastener inserted through the first port and the second port.

5. The unload tee apparatus according to claim 4, further comprising a biasing element on the latch tab, wherein the biasing element is configured to bias the catch to engage the catch pin.

6. The unload tee apparatus according to claim 5, further comprising
   a top side defined on the tee body opposite the underside; and
   a flange mounted towards the top side of the tee body.

7. The unload tee apparatus according to claim 6, further comprising a prop connected to and extending out from the flange, wherein the latch handle is configured to rest against the prop when the door is in an open position.

8. An apparatus for an unload tee having a tee body with a front side opposite of a rear side, and a top side opposite of an underside, comprising:
   a bore defined through the top side and the underside of the tee body;
   two front beams extending from the front side of the tee body;
   a hinge bar installed between the front beams, wherein the hinge bar is configured for rotational movement;
   a cover rotatably coupled to the hinge bar at the front side of the tee body; wherein the cover is configured to obstruct the bore when the cover is in a closed position;
   a latch handle connected to the cover, wherein the latch handle is accessible from the front side of the tee body;
   a valve installed above the top side of the tee body;
   an actuator for the valve, where in the actuator is accessible from the front side of the tee body;
   wherein the latch handle further comprises:
      an ear attached to a first end of the latch handle;
      a catch defined as a hook in the ear of the latch handle; and
      a catch pin protruding from the cover, wherein the catch is biased to engage the catch pin when the cover is in the closed position.

9. The apparatus according to claim 8, further comprising
   a snaking bar attached to the latch handle at a first end of said snaking bar, wherein said snaking bar is slidably positioned over the cover;
   a U-Bolt mounted towards the rear side of the tee body, wherein the U-Bolt defines a curve towards the underside of the tee body;
   a bushing installed on the curve of the U-Bolt; and
   wherein said snaking bar has an engaging end configured to engage the bushing when the cover is in the closed position.

10. A method of unloading material through an unload tee, comprising the steps of:
   pushing a latch tab connected to a latch handle, wherein the latch handle is connected to a cover of the unload tee;
   disengaging a catch defined on an ear of the latch tab from a catch pin protruding from the cover;
   pulling the latch handle;
   removing an engaging end of a snaking bar from a connection device installed towards a rear side of the unload tee;
   swinging open the cover from the unload tee;
   wherein the step of swinging open the cover comprises rotating the cover about a hinge bar mounted through a one or more arms defined on the cover and one or more beams extending from a front side of the unload tee; and further comprising the step of preventing movement of the latch handle by resting the latch handle against a prop installed on a flange of the unload tee.

11. The method according to claim 10, further comprising the step of actuating a valve above the unload tee.

12. The method according to claim 11, further comprising the step of removing a fastener from a first fastener port defined on the latch handle and a second fastener port defined on the cover.

13. The method according to claim 12, further comprising the step of converting rotational movement of the latch handle to translational movement of said snaking bar.

14. A method of unloading material through a valve to be mounted under a vehicle, comprising the steps of:
opening a cover from a bore in a tee body from an operating side of the tee body, wherein the tee body has at least two coupling ends and the bore;
closing the cover over the bore in the tee body from the same operating side;
wherein said steps of opening the cover from the bore and closing the cover over the bore are carried out via a latch handle connected to the cover and located on the same operating side;
sliding a bar, wherein the bar is attached to the latch handle at a first end of the bar during the steps of opening the cover and closing the cover, and wherein attachment of the bar to the latch handle is located at the operating side; and
engaging a second end of the bar towards a rear side of the tee body, wherein the rear side of the tee body is opposite the operating side.

15. A method of unloading material through a valve to be mounted under a vehicle, comprising the steps of:
opening a cover from a bore in a tee body from an operating side of the tee body, wherein the tee body has at least two coupling ends and the bore;
closing the cover over the bore in the tee body from the same operating side;
wherein said steps of opening the cover from the bore and closing the cover over the bore are carried out via a latch handle connected to the cover and located on the same operating side; and
wherein the steps of opening the cover and closing the cover further comprise the step of rotating the cover around an axis of a hinge at the operating side of the tee body, and further wherein the latch handle is pivotably connected to the cover at a fixed pivot point on the operating side of the tee body.

16. The method according to claim 15, further comprising the steps of rotating the latch handle around the axis of the hinge and angularly moving the latch handle towards and away from the axis of the hinge.

17. The method according to claim 16, wherein the step of angularly moving the latch handle is performed around a second axis through a fixed pivot point perpendicular to the axis of the hinge.

18. An apparatus to be mounted below a valve under a vehicle for unloading a volume of material, comprising:
a tee body having at least two coupling ends and a bore;
a cover rotatable over the bore in the tee body;
a first position wherein the bore is fully closed by the cover from an operating side of the tee body;
a second position wherein the bore is fully opened by the cover from the same operating side of the tee body;
a latch handle connected to the cover on the same operating side of the tee body;
wherein the latch handle is located on the same operating side of the tee body in both the first position and the second position;
a bar attached to the latch handle at a first end of the bar, wherein attachment of the bar to the latch handle is located towards the same operating side of the tee body, and wherein the bar is configured to hold the cover in the first position at a second end of the bar;
wherein the cover is rotatable around an axis of a hinge at the operating side of the tee body;
wherein the latch handle is pivotably connected to the cover at a fixed pivot point on the operating side of the tee body; and further wherein the latch handle is rotatable around the axis of the hinge and angularly movable towards and away from the axis of the hinge.

19. The apparatus of claim 18, wherein the angular movement of the latch handle is around a second axis through the fixed pivot point perpendicular to the axis of the hinge.

20. An apparatus to be mounted below a valve under a vehicle for unloading a volume of material, comprising:
a tee body having at least two coupling ends and a bore;
a cover rotatable over the bore in the tee body;
a first position wherein the bore is fully closed by the cover from an operating side of the tee body;
a second position wherein the bore is fully opened by the cover from the same operating side of the tee body;
a latch handle connected to the cover on the same operating side of the tee body;
wherein the latch handle is located on the same operating side of the tee body in both the first position and the second position;
a bar attached to the latch handle at a first end of the bar, wherein attachment of the bar to the latch handle is located towards the same operating side of the tee body, and wherein the bar is configured to hold the cover in the first position at a second end of the bar; and
wherein the second end of the bar is configured to engage a connection device located at the rear side of the tee body, wherein the rear side is opposite the operating side of the body.

21. The apparatus of claim 20, wherein the connection device is selected from the group consisting of a U-Bolt having a curve, a bushing, and a combination of the U-Bolt and the bushing installed on the curve of the U-Bolt.

22. The apparatus of claim 20, further comprising
an opening defined on the latch handle;
a first projection extending from the latch handle and adjacent to the opening, wherein the first projection defines a first port;
a second projection extending from the cover, wherein the second projection defines a second port and further wherein the second projection is configured to extend through the opening when the cover is in the first position.

* * * * *